US010207598B2

(12) United States Patent
Reynolds et al.

(10) Patent No.: US 10,207,598 B2
(45) Date of Patent: Feb. 19, 2019

(54) VEHICLE SEATING SYSTEM AND RELATED METHODS

(71) Applicant: Pink Adventure Group, Inc., Houston, TX (US)

(72) Inventors: Joseph Reynolds, Sedona, AZ (US); Greg McCallum, Sedona, AZ (US); Shawn Wendell, Sedona, AZ (US)

(73) Assignee: Pink Adventure Group, Inc., Houston, TX (US)

( * ) Notice: Subject to any disclaimer, the term of this patent is extended or adjusted under 35 U.S.C. 154(b) by 0 days.

(21) Appl. No.: 15/449,790

(22) Filed: Mar. 3, 2017

(65) Prior Publication Data

US 2017/0174100 A1   Jun. 22, 2017

Related U.S. Application Data

(63) Continuation-in-part of application No. PCT/US2015/053049, filed on Sep. 29, 2015, which
(Continued)

(51) Int. Cl.
*B60N 2/02* (2006.01)
*B60R 21/13* (2006.01)
(Continued)

(52) U.S. Cl.
CPC ........... *B60N 2/02* (2013.01); *B60H 1/00407* (2013.01); *B60H 1/2225* (2013.01); *B60N 2/01* (2013.01);
(Continued)

(58) Field of Classification Search
CPC ........ B60N 2/02; B60N 2/2245; B60N 2/305; B60N 2/01583; B60N 2/3013
See application file for complete search history.

(56) References Cited

U.S. PATENT DOCUMENTS 1,210,789 A * 1/1917 Name .................. B60N 2/3011
296/67
1,392,955 A 10/1921 Martin
(Continued)

FOREIGN PATENT DOCUMENTS

DE    10056024 A1 *  6/2002  ........... B60N 2/3013
DE    10340494 A1 *  4/2005  ........... B60N 2/3011
(Continued)

OTHER PUBLICATIONS

Spec sheet for Sport 4x4, Sport S 4x4, Sport RHD 4x4, Sahara 4x4, and Rubicon 4x4 models of 2014 Jeep Wrangler Unlimited, published at least as early as Sep. 30, 2014, available online at http://www.jeep.com/model-compare/detailed-chart/?modelYearCode=CUJ201407, last accessed Sep. 30, 2014.
(Continued)

*Primary Examiner* — Nicole T Verley

(57) ABSTRACT

Implementations of vehicle seating systems may include a movable chair including a metal frame having a seat portion and a back portion. The seat portion may have a first end and a second end and the back portion may have a first bar, a second bar, and a lock bar coupled between the first bar and the second bar. A latch pin may be configured to receive a first end of the lock bar coupled to the first bar of the seat portion when the movable chair is in a fully upright portion. The back portion may be configured to fold down and the seat portion may be configured to rotate upwardly on the seat hinge. The movable chair may be configured to lock into place in a fully upright position when the vehicle is in operation through a latching mechanism, the latch pin, and the lock bar.

20 Claims, 16 Drawing Sheets

Related U.S. Application Data is a continuation of application No. 14/505,485, filed on Oct. 2, 2014, now Pat. No. 9,145,092, and a continuation of application No. 14/869,939, filed on Sep. 29, 2015, now Pat. No. 9,463,745, which is a continuation of application No. 14/505,485, filed on Oct. 2, 2014, now Pat. No. 9,145,092.

(51) Int. Cl.

| | |
|---|---|
| B60N 2/24 | (2006.01) |
| B60R 21/11 | (2006.01) |
| B60N 2/01 | (2006.01) |
| B60R 3/00 | (2006.01) |
| B60H 1/00 | (2006.01) |
| B60H 1/22 | (2006.01) |
| B60N 2/20 | (2006.01) |
| B60N 2/30 | (2006.01) |
| B60N 2/36 | (2006.01) |
| B60N 2/38 | (2006.01) |
| B60N 3/02 | (2006.01) |
| B60R 3/02 | (2006.01) |
| B60R 22/22 | (2006.01) |

(52) U.S. Cl.
CPC .............. *B60N 2/012* (2013.01); *B60N 2/20* (2013.01); *B60N 2/24* (2013.01); *B60N 2/305* (2013.01); *B60N 2/366* (2013.01); *B60N 2/38* (2013.01); *B60N 3/02* (2013.01); *B60R 3/00* (2013.01); *B60R 3/002* (2013.01); *B60R 3/02* (2013.01); *B60R 21/11* (2013.01); *B60R 21/13* (2013.01); *B60R 22/22* (2013.01); *B60H 2001/00242* (2013.01); *B60H 2001/2293* (2013.01)

(56) References Cited

U.S. PATENT DOCUMENTS

| | | | | |
|---|---|---|---|---|
| 2,278,450 | A | | 10/1941 | Jones |
| 2,324,508 | A | | 3/1942 | Johnson |
| 2,535,242 | A | * | 12/1950 | Stuart ..................... B60P 3/423 |
| | | | | 296/102 |
| 2,665,165 | A | | 1/1954 | Pitman |
| 3,009,212 | A | | 11/1961 | Makens |
| 3,184,766 | A | | 5/1965 | Mortrude |
| 3,392,798 | A | | 7/1968 | Sipe |
| 3,455,597 | A | | 7/1969 | Sherbert |
| 4,319,777 | A | | 3/1982 | Law |
| 5,228,707 | A | | 7/1993 | Yoder |
| 5,248,178 | A | * | 9/1993 | Brambilla ................ B60N 2/01 |
| | | | | 296/65.09 |
| 5,263,763 | A | * | 11/1993 | Billette ................ B60N 2/3013 |
| | | | | 296/63 |
| 5,615,922 | A | | 4/1997 | Blanchard |
| 5,868,412 | A | | 2/1999 | Hinkle |
| 5,947,541 | A | | 9/1999 | Behrens et al. |
| 6,375,245 | B1 | * | 4/2002 | Seibold .............. B60N 2/01583 |
| | | | | 248/503.1 |
| 6,460,915 | B1 | | 10/2002 | Bedi et al. |
| 6,588,783 | B2 | | 7/2003 | Fichter |
| 6,655,724 | B1 | * | 12/2003 | Yoshino ............... B60N 2/3013 |
| | | | | 248/503.1 |
| 6,685,204 | B1 | | 2/2004 | Hehr |
| 6,908,107 | B2 | | 6/2005 | Barth |
| 7,077,451 | B2 | * | 7/2006 | Rhodes ................ B60N 2/3013 |
| | | | | 296/65.01 |
| 7,086,689 | B2 | * | 8/2006 | Dean ..................... B60J 5/0487 |
| | | | | 296/182.1 |
| 7,171,908 | B2 | | 2/2007 | Lamarche |
| 7,252,320 | B2 | * | 8/2007 | Tsujibayashi ...... B60N 2/01583 |
| | | | | 296/65.05 |
| 7,287,770 | B2 | | 10/2007 | Drabant et al. |
| 7,318,616 | B1 | * | 1/2008 | Bradley ................ B60N 2/206 |
| | | | | 296/37.15 |
| 7,325,860 | B2 | | 2/2008 | Day |
| 7,338,112 | B2 | | 3/2008 | Gilliland et al. |
| 7,374,222 | B2 | * | 5/2008 | McLaughlin ........ B60N 2/3011 |
| | | | | 296/65.05 |
| 7,464,963 | B2 | | 12/2008 | Hepner et al. |
| 7,484,794 | B2 | * | 2/2009 | Loup .................. B60N 2/01541 |
| | | | | 296/208 |
| 7,513,520 | B2 | | 4/2009 | Okuyama |
| 7,559,594 | B2 | * | 7/2009 | McMillen ............. B60N 2/206 |
| | | | | 296/65.09 |
| 7,637,563 | B2 | | 12/2009 | Plett et al. |
| 7,673,892 | B2 | | 3/2010 | Kuntze et al. |
| 7,731,212 | B2 | | 6/2010 | Storer |
| 7,931,338 | B2 | * | 4/2011 | Lindsay ............... B60N 2/2245 |
| | | | | 297/354.12 |
| 8,075,040 | B2 | * | 12/2011 | Arnold ................. B60N 2/3013 |
| | | | | 296/183.2 |
| 8,196,990 | B2 | * | 6/2012 | Aebker ..................... B60N 2/36 |
| | | | | 296/69 |
| 8,210,582 | B2 | | 7/2012 | Parfut et al. |
| 8,215,690 | B2 | * | 7/2012 | Nishiike ................. B60P 3/423 |
| | | | | 296/186.4 |
| 8,303,013 | B2 | * | 11/2012 | Horiuchi .............. B60N 2/3011 |
| | | | | 296/24.43 |
| 8,333,421 | B2 | * | 12/2012 | Blake .................. B60N 2/01591 |
| | | | | 296/65.03 |
| 8,366,129 | B2 | * | 2/2013 | Salmon ..................... B60R 3/02 |
| | | | | 280/163 |
| 8,408,347 | B2 | | 4/2013 | Chapman |
| 8,505,999 | B2 | * | 8/2013 | Whalen ................ B60N 2/3013 |
| | | | | 296/65.09 |
| 8,585,116 | B2 | * | 11/2013 | King ....................... B62D 33/03 |
| | | | | 296/24.33 |
| 8,651,550 | B2 | * | 2/2014 | Mather ................. B60N 2/3075 |
| | | | | 296/37.14 |
| 8,864,174 | B2 | | 10/2014 | Minami et al. |
| 8,899,620 | B1 | | 12/2014 | Bhardwaj et al. |
| 8,899,659 | B2 | | 12/2014 | Angelo |
| 8,944,465 | B2 | | 2/2015 | Shinbori |
| 8,950,812 | B2 | * | 2/2015 | Haller .................... B60N 2/206 |
| | | | | 297/336 |
| 9,381,836 | B2 | * | 7/2016 | Sawada ................ B60N 2/3011 |
| 9,457,724 | B2 | * | 10/2016 | Lu ............................ B60R 5/045 |
| 9,604,552 | B2 | * | 3/2017 | Akutsu ................. B60N 2/3013 |
| 9,789,789 | B2 | * | 10/2017 | Akutsu ..................... B60N 2/12 |
| 2008/0238020 | A1 | | 10/2008 | Okada et al. |
| 2009/0179450 | A1 | | 7/2009 | Brown et al. |
| 2010/0181741 | A1 | | 7/2010 | Webb |
| 2010/0194070 | A1 | | 8/2010 | Stauffer et al. |
| 2011/0227385 | A1 | * | 9/2011 | Holder ................. B60N 2/3013 |
| | | | | 297/337 |
| 2012/0056411 | A1 | * | 3/2012 | Nakamura ........... B62D 21/186 |
| | | | | 280/756 |
| 2014/0077536 | A1 | * | 3/2014 | Mather ................... B60R 7/043 |
| | | | | 297/188.08 |
| 2014/0167379 | A1 | | 6/2014 | Kibler |
| 2014/0217790 | A1 | | 8/2014 | Stavros |
| 2014/0239609 | A1 | | 8/2014 | Robertson |
| 2014/0333042 | A1 | | 11/2014 | Cha et al. |
| 2014/0353956 | A1 | | 12/2014 | Bjerketvedt et al. |
| 2015/0042060 | A1 | | 2/2015 | Cha et al. |
| 2015/0060205 | A1 | | 3/2015 | Blackwell et al. |
| 2015/0102591 | A1 | | 4/2015 | Perez De Larraya Sagues |
| 2016/0137105 | A1 | * | 5/2016 | Akutsu .................... B60N 2/06 |
| | | | | 297/341 |
| 2017/0029035 | A1 | * | 2/2017 | Dube ..................... B60K 15/063 |
| 2017/0088023 | A1 | * | 3/2017 | Smuk ................... B60N 2/01583 |
| 2017/0225595 | A1 | * | 8/2017 | Ikawa .................... B60N 2/3065 |

FOREIGN PATENT DOCUMENTS

| | | | | |
|---|---|---|---|---|
| DE | 102006036121 A1 | * | 2/2008 | ........... B60N 2/3013 |
| DE | 102007052529 A1 | * | 5/2009 | ........... B60N 2/3018 |
| DE | 102008057537 A1 | | 5/2010 | |
| EP | 2106958 A1 | * | 10/2009 | ........... B60N 2/0155 |

(56) References Cited

FOREIGN PATENT DOCUMENTS

| FR | 2740405 A1 * | 4/1997 | ............ B60N 2/203 |
|----|--------------|--------|------------------------|
| GB | 2306408 A | 5/1997 | |
| WO | WO2008099371 A1 | 8/2008 | |

OTHER PUBLICATIONS

Spec sheet for Sport 4x4, Sport S 4x4, Willys Wheeler 4x4, Willys Wheeler W 4x4, Sahara 4x4, Rubicon 4x4, and Rubicon Hard Rock 4x4 models of 2015 Jeep Wrangler Unlimited, published at least as early as Sep. 30, 2014, available online at http://www.jeep.com/model-compare/detailed-chart/?modelYearCode=CUJ201507, last accessed Sep. 30, 2014.

Photographs of rear entry and other elements of a vehicle, photographed Aug. 29, 2014.

\* cited by examiner

VEHICLE SEATING SYSTEM AND RELATED METHODS

CROSS REFERENCE TO RELATED APPLICATIONS

This application is a continuation-in-part application of the Patent Cooperation Treaty application to Reynolds, et al., entitled "Side Entry Vehicle System and Related Components," application serial number PCT/US15/53049, filed Sep. 29, 2015, now pending, which claimed priority to U.S. patent application to Reynolds, et al., entitled "Side Entry Vehicle System and Related Components," application Ser. No. 14/505,485 filed on Oct. 2, 2014, now U.S. Pat. No. 9,145,092 and also which claimed priority to U.S. Utility patent application to Reynolds, et al., entitled "Side Entry Vehicle System and Related Components," application Ser. No. 14/869,939, filed Sep. 29, 2015, now U.S. Pat. No. 9,463,745, the disclosures of each of which are hereby incorporated entirely herein by reference.

BACKGROUND

1. Technical Field

Aspects of this document relate generally to seating, entry and other components for vehicles. More specific implementations involve side entry components for four-by-four off-road sport utility vehicles (SUVs).

2. Background

Many vehicles have a rear passenger section, usually aft of a front driver's seat and a front passenger seat. Some vehicles with rear passenger sections do not have a rear passenger side entry door, but have a front driver's side door and a front passenger side door. In such vehicles the rear passenger section is generally made accessible by temporarily moving the back of the front driver seat or front passenger seat forward so that passengers may enter the rear passenger section behind the collapsed and folded down seat.

SUMMARY

Implementations of vehicle seating systems may include: a movable chair including a metal frame having a seat portion and a back portion. The seat portion may have a first end and a second end and the back portion may have a first bar, a second bar, and a lock bar coupled between the first bar and the second bar. The second end of the seat portion may be coupled to the first bar and the second bar of the back portion through a seat hinge. A step may be coupled through a step hinge with the first end and the second end of the seat portion through a bracket and through a latch mechanism. A latch pin may be configured to receive a first end and the second end of the seat portion through a bracket and through a latch mechanism. A latch pin may be configured to receive a first end of the lock bar coupled to the first bar of the seat portion when the movable chair is in a fully upright portion. The back portion may be configured to fold down and the seat portion may be configured to rotate upwardly on the seat hinge to allow a passenger to one of enter and exit the vehicle. The movable chair may be configured to lock into place in a fully upright position when the vehicle is in operation through the latching mechanism, the latch pin, and the lock bar.

Implementations of vehicle seating systems may include one, all, or any of the following:

The vehicle seating system may further include a cushion coupled to each of the seat portion and the back portion of the movable chair.

The vehicle seating system may further include a roll cage. The roll cage may include a first end and a second end. The first end may be coupled to a frame of a windshield of the vehicle and the second end may be coupled to a back bumper of the vehicle.

The movable chair may be positioned adjacent a bench seat to, in combination with the bench seat, form a first row of seats in a passenger portion of the vehicle.

The vehicle seating system may further include: a second row of seats including two individual seats spaced to allow a passenger enough room to walk between the two individual seats. The second row of seats may be positioned at a higher level relative to a subfloor of the vehicle that the first row of seats. The vehicle seating system may also include a third row of seats including a bench seat configured to seat at least three passengers. The third row of seats may be positioned at a second level that is higher than the second row of seats relative to a subfloor of the vehicle.

The vehicle seating system may further include a heater positioned under the bench seat of the first row wherein the heater may be configured to blow heated air towards the second row and toward the third row of seats.

Implementations of vehicle seating systems may include: a first row of seats including a bench seat and a movable chair. The movable chair may include a metal frame including a seat portion and a back portion. The seat portion may include a first end and a second end. The back portion may include a first bar, a second bar and a lock bar coupled between the first bar and the second bar. The second end of the seat portion may be coupled to the first bar and the second bar of the back portion through a seat hinge. A step hinge may be coupled to a subfloor of the vehicle. The movable chair may be hingedly coupled to the step through a step hinge and the first end and the second end of the seat portion using a bracket and a latch mechanism. The movable chair may be configured to collapse and then fold forward to allow a passenger to enter the vehicle. A latch pin may be configured to receive a first end of the lock bar coupled to the first bar of the seat portion when the movable chair is in a fully upright position. A latch pin may be configured to receive a first end of the lock bar coupled to the first bar of the seat portion when the movable chair is in a fully upright position. A second row of seats including two individual seats may be included and configured to allow a passenger enough room to walk between the seats. The second row of seats may be positioned at a higher level relative to the subfloor that the first row of seats. A third row of seats including a bench seat may be included and configured to seat at least three passengers. The third row of seats may be positioned at a second level that is higher relative to the subfloor than the second row of seats.

Implementations of vehicle seating systems may include one, all, or any of the following:

One or more cushions may be coupled to each of the row of seats. The cushions may include a seat cushion and a back cushion.

A roll cage extending over the vehicle seating system. The roll cage may include a first end and a second end where the first end may be coupled to a frame of a windshield of the vehicle and the second end may be coupled to a back bumper of the vehicle.

The vehicle seating system may further include two or more grab handles fixedly coupled to a top portion of a body of the vehicle adjacent the first row of seats, the second row of seats, and the third row of seats.

One or more seat belts at each seat in the vehicle may be included where the seat belts may be coupled to a platform on a floor of the vehicle.

A heater may be positioned under the bench seat of the first row where the heater may be configured to blow air towards the second row and towards the third row of seats.

Implementations of vehicle seating systems may include: a first row of seats including a bench and a movable chair. The movable chair may include a metal frame having a seat portion and a back portion. The seat portion may include a first end and a second end. The back portion may include a first bar, a second bar and a lock bar coupled between the first bar and the second bar. The second end of the seat portion may be coupled to the first bar and the second bar of the back portion through a seat hinge. A step may be coupled to a subfloor of the vehicle. The movable chair may be hingedly coupled to the step through a step hinge and the first end and the second end of the seat portion through a bracket and a latch mechanism. The movable chair may be configured to collapse and then fold forward to allow a passenger to enter the vehicle. A latch pin may be configured to receive a first end of the lock bar coupled to the first bar of the seat portion when the movable chair may be in a fully upright position. A second row of seats may include two individual seats configured to allow a passenger enough room to walk between the seats. The second row of seats may be positioned at a higher level relative to the subfloor that the first row of seats. A third row of seats may include a bench seat configured to seat at least three passengers. The third row of seats may be positioned in an extended portion at a back of the vehicle and at a second level that is higher relative to the subfloor than the second row of seats.

Implementations of vehicle seating systems may include one, all, or any of the following:

One or more cushions may be coupled to each of the row of seats. The one or more cushions may include a seat cushion and a back cushion.

A roll cage may extend over the vehicle seating system. The roll cage may include a first end and a second end where the first end may be coupled to a frame of a windshield of the vehicle and the second end may be coupled to a back bumper of the vehicle.

Two or more grab handles may be fixedly coupled to a top portion of a body of the vehicle adjacent the first row of seats, the second row of seats and the third row of seats.

One or more seat belts may be located at each seat in the vehicle wherein the seat belts may be coupled to a platform on a floor of the vehicle.

A heater may be positioned under the bench seat of the first row where the heater may be configured to blow air towards the second row and toward the third row of seats.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
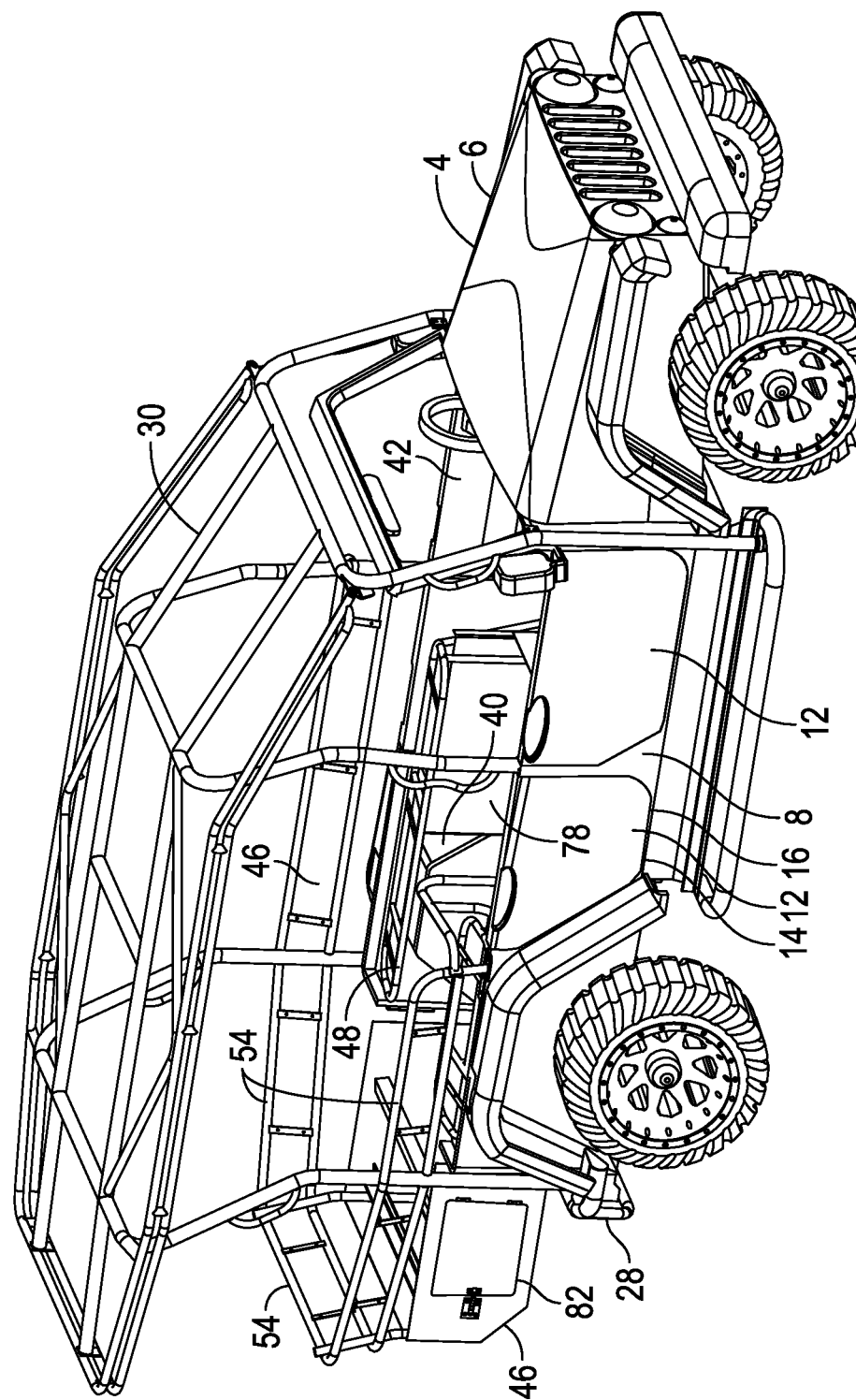
FIG. 1 is a perspective view of an implementation of a vehicle illustrating an implementation of a side entry system.

This disclosure, its aspects and implementations, are not limited to the specific components, assembly procedures or method elements disclosed herein. Many additional components, assembly procedures and/or method elements known in the art consistent with the intended vehicle seating system will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such vehicle seating system and implementing components and methods, consistent with the intended operation and methods.

Referring now to FIGS. 1-8, an implementation of a vehicle 4 is shown which may be used for implementing a side entry system 2. The vehicle 4 is a four-wheel drive off-road sport utility vehicle (SUV) 6. SUV 6 in the implementation illustrated is a vehicle sold under the trade name JEEP WRANGLER UNLIMITED by Chrysler Group LLC of Auburn Hills, Mich. and modified from its stock configuration in certain ways. For example, the ground clearance has been increased to be about 10.25 inches at a rear axle and about 18 inches at a fuel tank of the vehicle 4, when measured with no cargo and no passengers. Additionally, the wheel base of the vehicle 4 has been modified to be about 114.75 inches and the axle track of the final version is about 69 inches. In various implementations disclosed herein an SUV 6 may be utilized for the side entry system 2 but with different clearances, wheel base and axle track measurements. Also, in particular implementations, the SUV 6 could be a vehicle other than a JEEP WRANGLER UNLIMITED.

The vehicle 4 in particular implementations may be any of the following vehicle models of the JEEP WRANGLER UNLIMITED sold by Chrysler Group LLC: a SPORT 4×4, SPORT S 4×4, SPORT RHD 4×4, SAHARA 4×4, or RUBICON 4×4 model of the 2014 JEEP WRANGLER UNLIMITED, or a SPORT 4×4, SPORT S 4×4, WILLYS WHEELER 4×4, WILLYS WHEELER W 4×4, SAHARA 4×4, RUBICON 4×4, or RUBICON HARD ROCK 4×4 model of the 2015 JEEP WRANGLER UNLIMITED. Other current or future SUV models by the same or other providers may be used that include three or more doors.

The vehicle 4 in various implementations has at least four doors 12 and one of these doors 12 is a rear passenger door 14. In other implementations, the vehicle 4 could have only three doors 12 provided that at least one of the doors 12 is a rear passenger door 14. The rear passenger door 14 is located on a side of the vehicle 4 and not at or on a rear 24 of the vehicle 4. In some implementations, as those illustrated, there is no passenger entry door at the rear 24 of the vehicle 4. As illustrated, the rear passenger door 14 is located on a side of the vehicle 4 opposite the driver side of the vehicle 4, though the rear passenger door 14 and, accordingly, the side entry system 2, could in other implementations be on the same side of the vehicle 4 corresponding with the driver side. This is particularly true where the vehicle 4 is configured to have the driver's side on either the left or right side of the vehicle, depending upon the side of the road (right or left) on which the vehicle is driven in a particular country.

Figure 3:
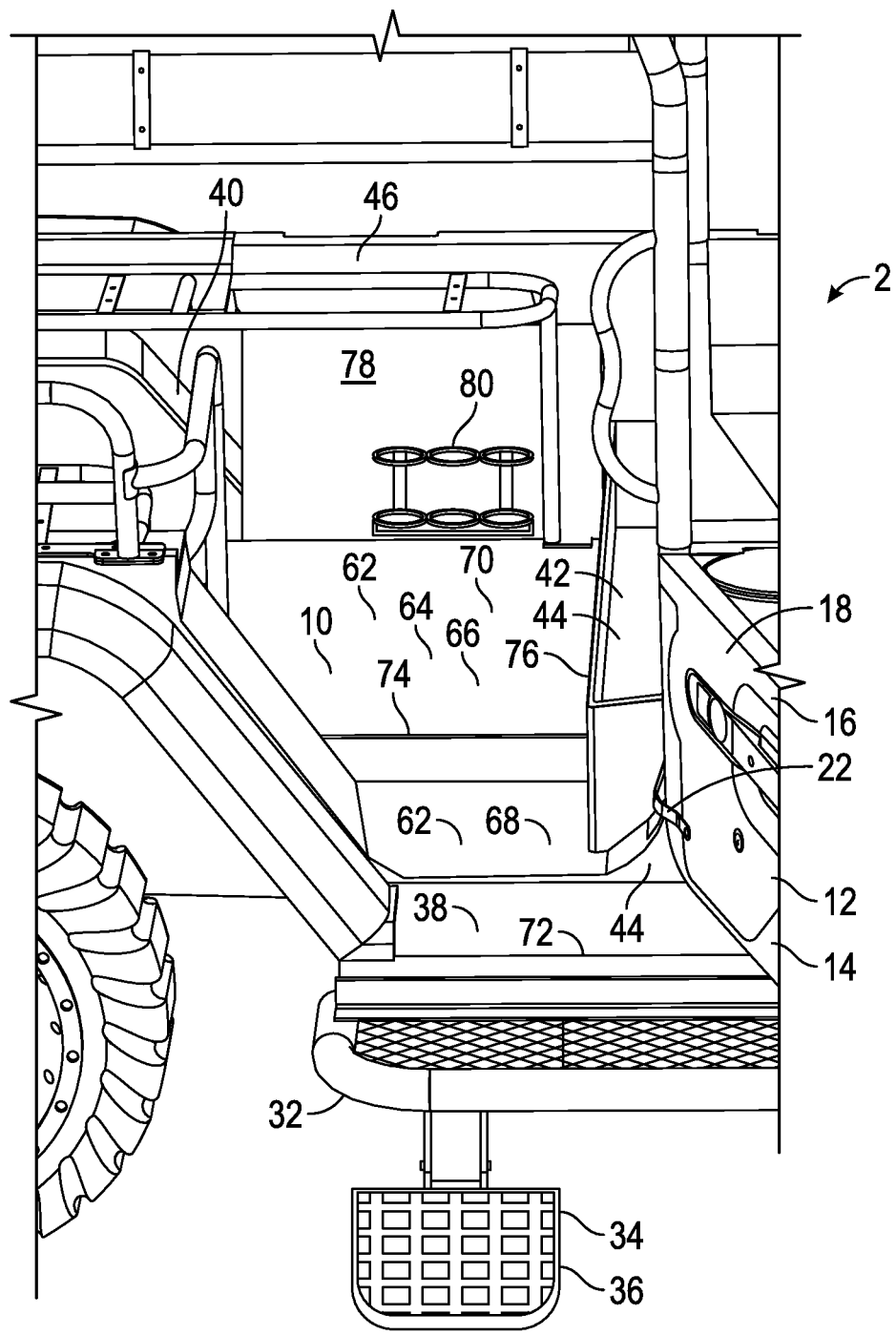
FIG. 3 is a front view of an implementation of a side entry system.
Figure 6:
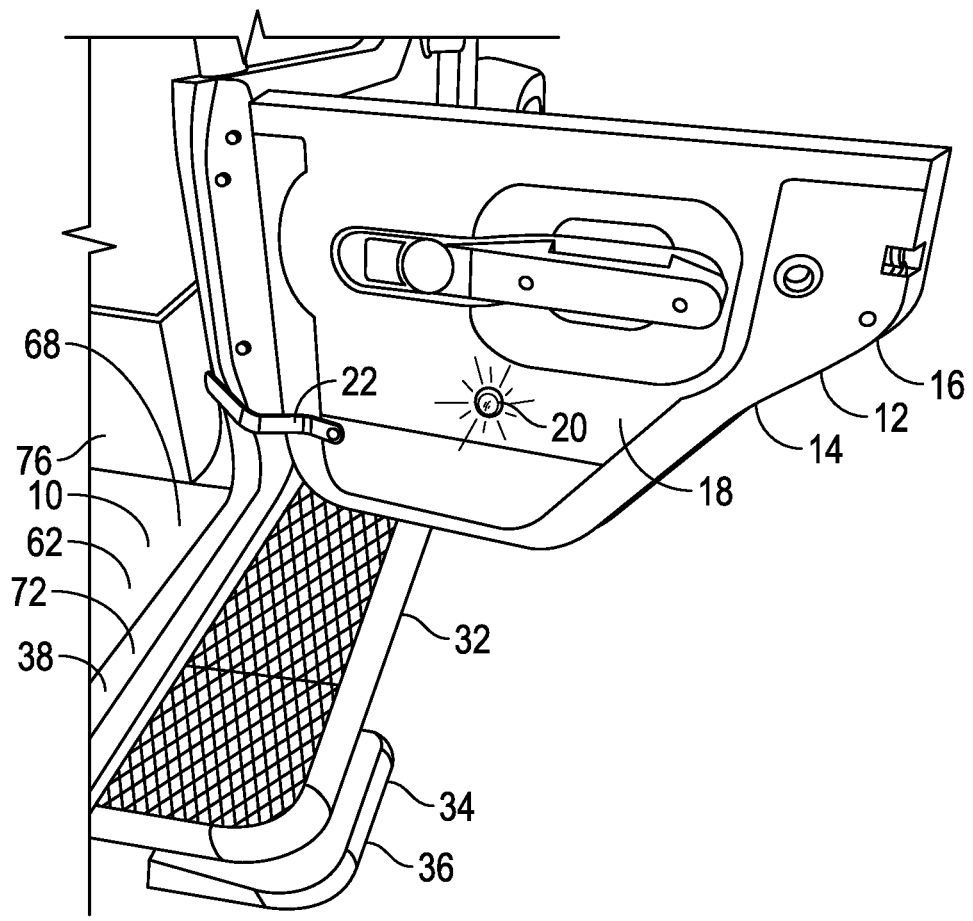
FIG. 6 is a rear view of an implementation of a side entry system.
Figure 7:
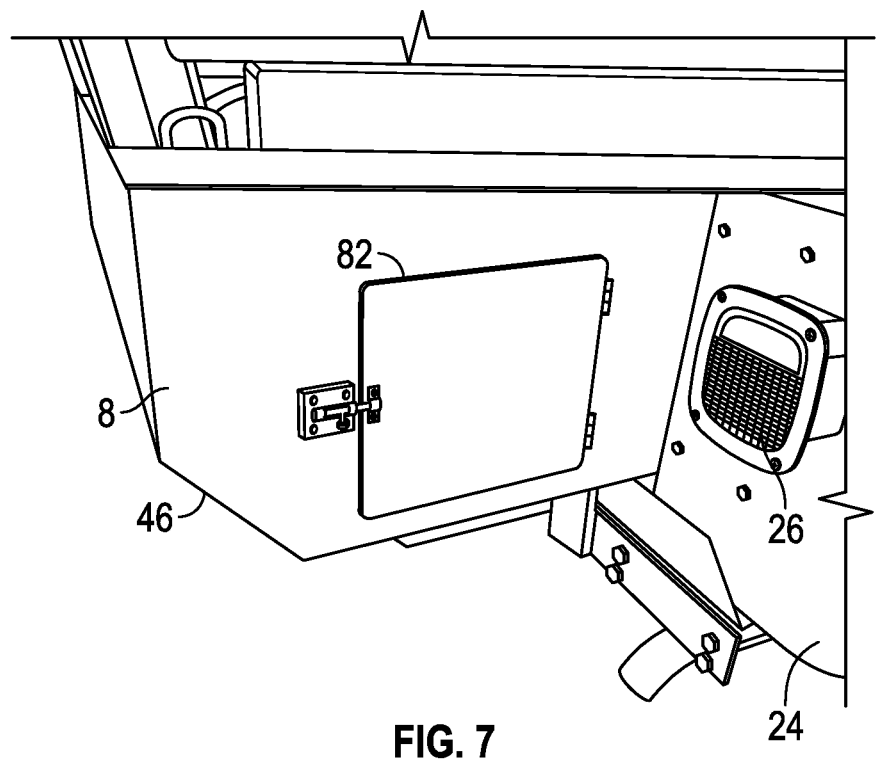
FIG. 7 is a side view of a closed storage compartment of the vehicle of FIG. 1.
Figure 8:
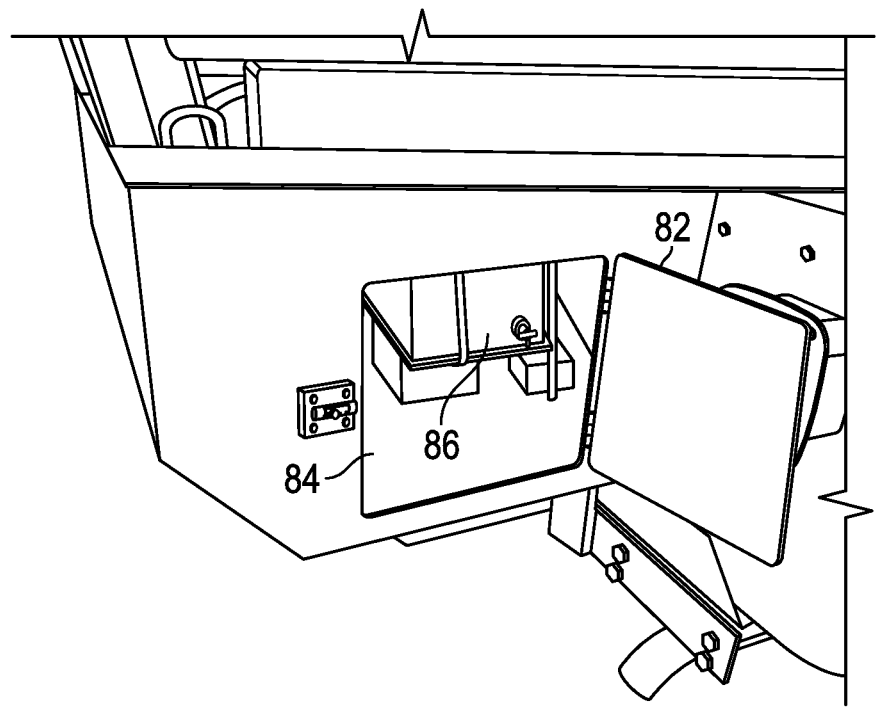
FIG. 8 is a side view of the storage compartment of FIG. 7 in the open configuration.
Figure 28:
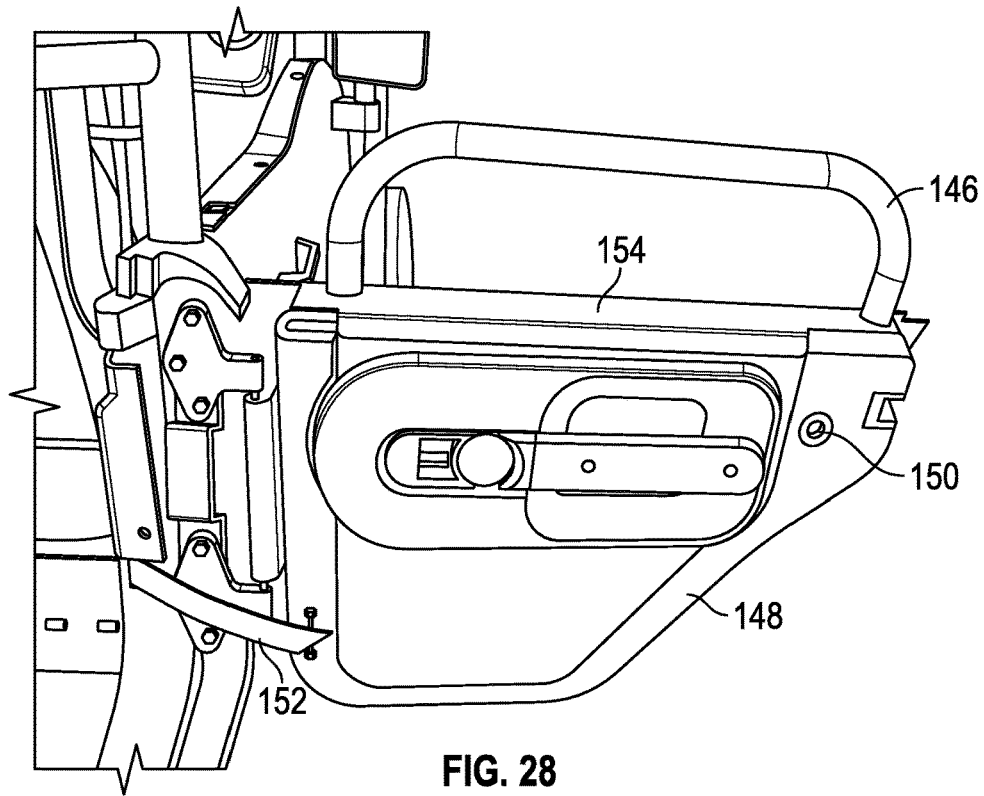
FIG. 28 is a front view of an implementation of a door of a vehicle having an implementation of a vehicle seating system.

The rear passenger door 14 shown in some implementations will be a half door 16 that is vertically hinged to the vehicle 4, which is the door type illustrated in the drawings. In implementations, a different type of door could be used together with the side entry system 2 such as, by non-limiting example, a sliding door, a full door, and a door having a transparent glass or polymer window therein or coupled thereto. Referring to FIGS. 3, 6 and 28, a cable 22 provides electricity to a light 20 that is located on an internal side 18 of the rear passenger door 14. The light 20 is positioned and configured to illuminate the side entry system 2. The cable 22 also may serve as a stop for the rear passenger door 14 to prevent it from opening beyond a desired stopping point.

Figure 2:
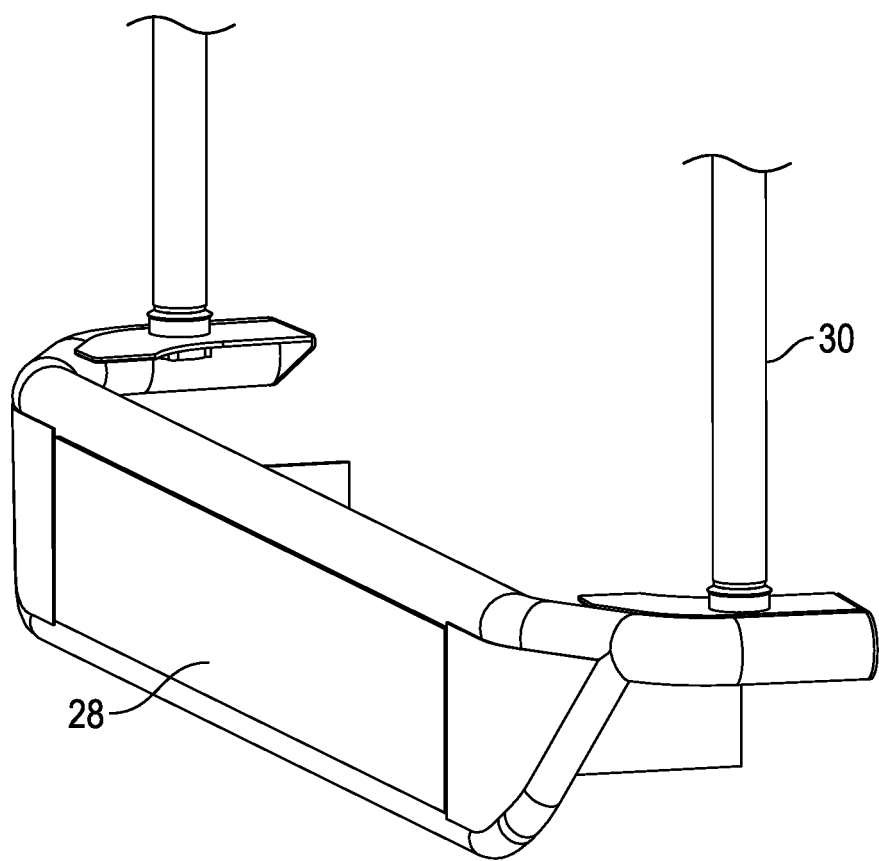
FIG. 2 is a perspective view of a rear bumper and roll cage implementation of the vehicle of FIG. 1.
Figure 26:
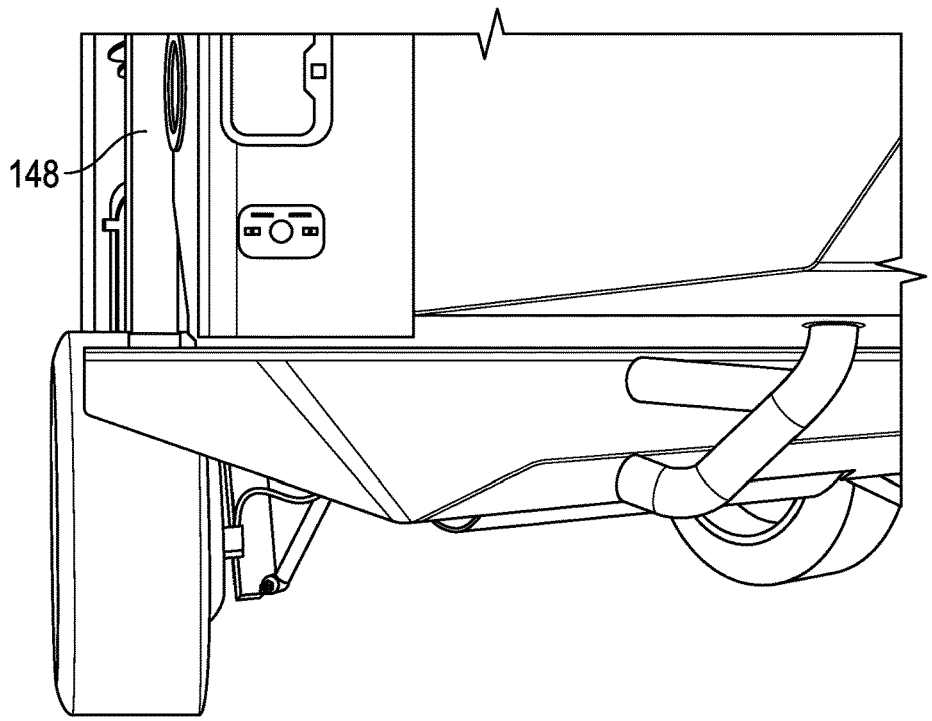
FIG. 26 is a back view of an implementation of a bumper and an extended portion of a vehicle having a vehicle seating system.

The vehicle 4 has an exterior 8 and an interior 10, and the doors 12 open to allow a passenger to enter the interior 10 of the vehicle 4 and to allow a passenger to exit the interior 10. A roll cage 30 is attached to the vehicle 4 to protect occupants of the vehicle 4 in case the vehicle 4 tips or rolls during operation. A rear bumper 28 is coupled to a rear 24 of the vehicle 4 and a rear taillight 26 is also attached to the rear 24 of the vehicle 4. The roll cage 30 is coupled directly to the rear bumper 28 rather than to the rear portion of the vehicle body, as shown in FIGS. 2 and 26, to provide additional stability and security to the vehicle 4 in case the vehicle 4 tips or rolls over. This aspect of the roll cage 30 and rear bumper 28 is in contrast with conventional SUV roll cages which couple only to the vehicle body. This capability enables the roll cage to extend fully over the seating of the vehicle, including a passenger pod 46 included in the vehicle 4.

Figure 5:
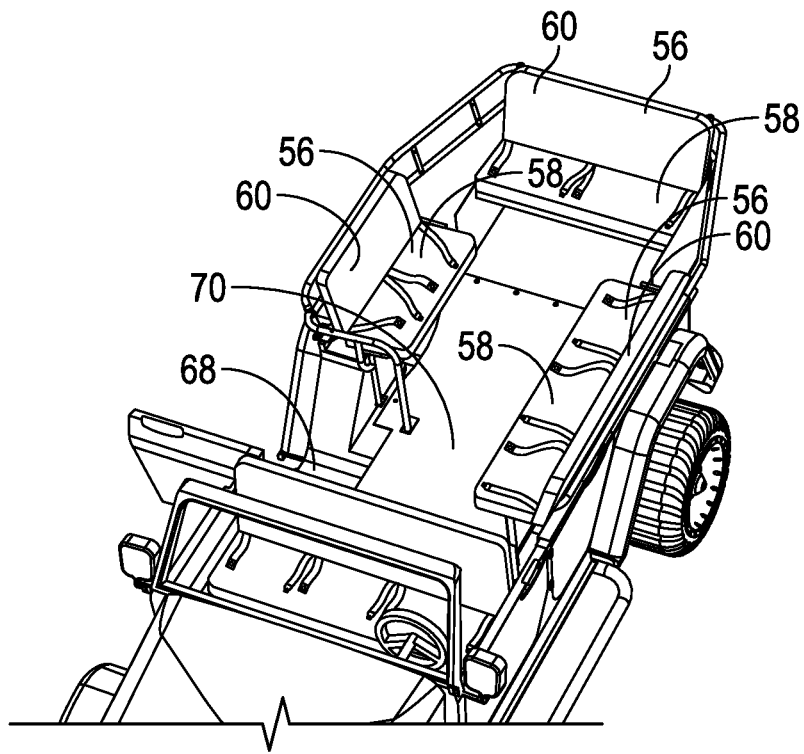
FIG. 5 is a top view of an implementation of a side entry system.

The vehicle 4 includes a driver section 42, which includes the driver's seat and at least one passenger's seat next to the driver on an opposing side of the vehicle. The passenger pod 46 is also included and has seating for at least seven passengers. Accordingly, the vehicle 4 includes seating for at least nine adults, including eight adult passengers and one adult driver. Each seat location may include at least one lap seatbelt as depicted in FIG. 5.

Referring now to FIG. 3, a side entry system 2 for the vehicle 4 is shown. A running board 32 is coupled to the exterior 8 of the vehicle 4 that aids passengers to enter the vehicle 4. A first step 72 is located at or within a sill 38 of the vehicle 4 and is accessible upon opening the rear passenger door 14. The first step 72 is configured to assist a passenger's entering the vehicle 4 and is positioned above the running board 32. A second step 74 is located in the interior 10 of the vehicle 4 adjacent to and above the first step 72, the second step 74 assisting the passenger's full entry into the vehicle 4 and the passenger pod 46.

The second step 74 is formed in a second floor 62 that is positioned above a first floor 44 of the vehicle 4. The first floor 44 in implementations is an original floor of the vehicle's body and the second floor 62 is an additional surface that installed above the original floor. The second floor 62 has a first level 68 and, above the first level 68, a second level 70. The first step 72 is flush with, or is substantially flush with, the first level 68, and thus brings a passenger to the first level 68 when a passenger uses the first step 72. The second step 74 is flush with, or is substantially flush with, the second level 70, and thus brings a passenger to the second level 70 when a passenger uses the second step 74. The second floor 62 forms a largest floor section 64 of the vehicle 4. The largest floor section 64 is parallel with, or is substantially parallel with, the first floor 44. The first floor 44 corresponds with approximately the level of the driver section 42 of the vehicle 4 while the second floor 62 corresponds with and forms the floor of the passenger pod 46. In implementations the second floor 62 and/or the second level 70 of the second floor 62 is formed with a raised panel 66. The second floor 62 in implementations is formed of metal, such as steel, and/or includes steel segments or portions that are welded and/or otherwise joined together. Various support brackets, fasteners, and related structures (not show in the drawings) are used to couple and attach the second floor to the original floor of the vehicle, and to provide support for the first step 72 and the second step 74.

Referring to FIGS. 3 and 6, a substantially vertical divider 76 separates the passenger pod 46 from the driver section 42. The substantially vertical divider 76 may be formed of the same material as the second floor 62, such as a metal and may be welded or otherwise joined (bolted, fastened, etc.) to the second floor 62 or to the first floor 44. The substantially vertical divider 76 provides a barrier to prevent items such as water, mud, water bottles, backpacks, food items, and other items in the passenger pod 46 from rolling, sliding or otherwise shifting into the driver section 42 during movement of the vehicle 4, such as while driving over rough terrain. The substantially vertical divider 76 also prevents items from moving from the driver section 42 to the passenger pod 46. The substantially vertical divider 76 may facilitate cleaning of the passenger pod 46 through hosing down the passenger pod 46 as the substantially vertical divider 76 may allow the water and/or mud and debris to flow out the vehicle 4 (such as out the rear passenger door 14) without entering the driver section 42. In implementations the substantially vertical divider 76 may be a fully vertical divider and in implementations it may have a height of, or of about, or at least, one inch, two inches, three inches, four inches, five inches, six inches, seven inches, eight inches, or one foot.

In particular system implementations a third step 34 is provided. The third step 34 in various implementations is an adjustable step 36 which collapses to a non-use or storage position below the running board 32 and expands to an in-use position below the running board 32. The running board 32 is positioned above the third step 34. In other implementations a third step 34 could be a non-adjustable or otherwise fixed step or a step that is not fixed to the running board 32 or other vehicle, but is portable. The third step 34 assists a passenger's entry into the vehicle 4 by providing a first surface for the passenger to step up on during entry of the vehicle. The third step 34, running board 32, first step 72 and second step 74 are sized and arranged to allow a passenger to make a standing entry into the passenger pod 46 of the vehicle 4 through the rear passenger door 14. This is accomplished as the passenger first steps up on the third step, then onto the running board 32, the first step 72, and finally onto the second step 74. Once the passenger has fully ascended the second step 74, the passenger is now able to walk to a seat in the passenger pod 46. Because the body of the vehicle is open and covered by the roll cage 30, passengers are able to walk directly up into the vehicle using the running board 32, first step 72, and the second step 74 (and in particular implementations, the third step 34) through the rear passenger door 14.

Figure 4:
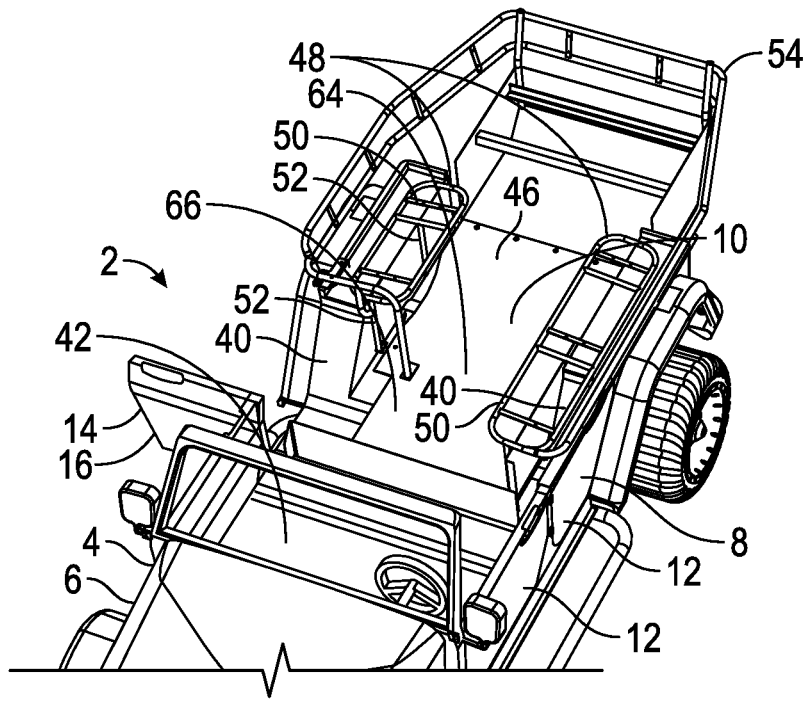
FIG. 4 is a top view of an implementation of a side entry system.

Referring to FIGS. 4 and 5, a plurality of seat frames 48 are provided in the passenger pod 46, each seat frame 48 including a plurality of horizontal members 50 configured to hold or support a seat bottom 58 and a plurality of vertical members 52 configured to couple to or support the horizontal members 50 and to attach to the second floor 62. A plurality of passenger seats 56 are included in the passenger pod 46, each passenger seat 56 being formed using the seat frame 48. Each passenger seat 56 includes, in addition to a seat bottom 58, a seat back 60. A seat back frame 54 sits behind the seat backs 60 of the plurality of passenger seats 56 and extends along the sides and along the back of the passenger pod 46, and along the sides and along the back of the vehicle 4. The seat back frame 54 in implementations is positioned within one of the following distances from a seat back 60 of each passenger seat 56 of the passenger pod 46: less than one inch; one inch; two inches; three inches; four inches; five inches; six inches; seven inches; eight inches; or one foot. In system implementations, the driver's seat, the passenger seat directly to the side of the driver's seat, and the driver section 42 do not form any part of the passenger pod 46. As may be seen from FIGS. 1 and 3-5, in particular implementations, there are two passenger seats 56, on either side of the interior 10 and within the passenger pod 46, which are each positioned directly above a wheel well 40 of the vehicle 4.

A substantially vertical panel 78 within the passenger pod 46 is coupled to a side of the interior 10 of the vehicle 4 and at least partially hides one wheel well 40. The substantially vertical panel 78 in implementations may be fully vertical, and in implementations, as shown in the drawings, it is positioned directly below a passenger seat 56. In implementations a beverage holder 80 is attached to or is otherwise coupled to the substantially vertical panel 78. The substantially vertical panel 78 may also serve to form an edge of the second floor 62 and prevent objects from falling down into the space between the edge of the vehicle and the second floor 62.

In particular implementations, a storage compartment 84 is provided below one of the passenger seats 56 of the passenger pod 46 (the rearmost passenger seat 56, in the implementations shown in the drawings). The storage compartment 84 is accessed using an access door 82 provided on the exterior 8 of the vehicle 4 and is opened via a latching or other closure mechanism. A removable water storage unit 86 may be stored within the storage compartment 84 such as to provide fresh drinking water (or drinking water refills) to passengers during a tour or other outing.

As can be seen in the drawings, a portion of the passenger pod 46 extends aft of the rear taillight 26 of the vehicle 4 and aft of the rear 24 of the vehicle 4 (including the rear bumper) and includes a passenger seat 56 positioned at least mostly aft of the rear taillight 26. In implementations the passenger pod 46 includes a passenger seat 56 (the rearmost passenger seat 56 in the implementations shown in the drawings) that is positioned entirely aft of the rear taillight 26.

One of the basic and novel characteristics of implementations of a side entry system 2 is its facilitation of a passenger's standing entry into a rear passenger door 14 of an SUV 6 allowing the passenger to be substantially fully standing before, during and after the entry process, or in other words, without requiring the passenger to hunch or bend down during entry into the vehicle 4. Such a system also does not require the passenger to maneuver around a rear passenger chair of any kind present in the passenger's path into the SUV 6. Also, such a system does not require the passenger to have to enter the vehicle 4 behind a collapsed/folded down passenger side front seat, which is in contrast to conventional entry systems involving SUV's.

Figure 9:
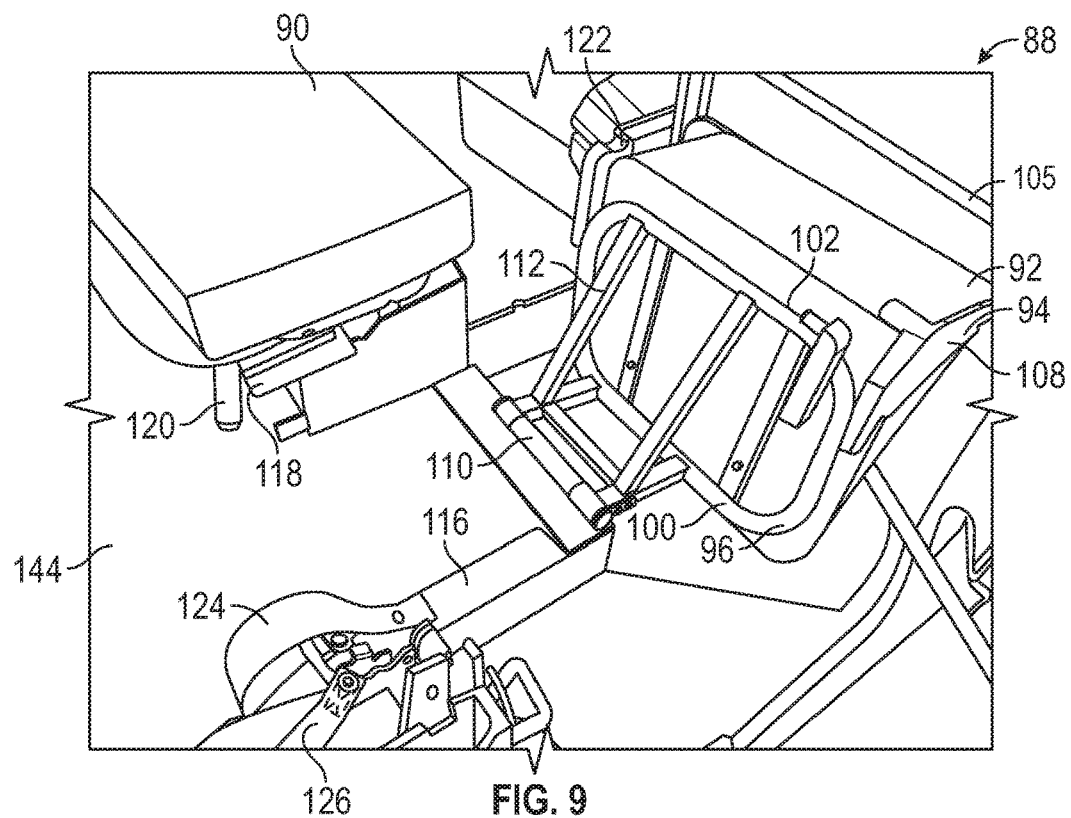
FIG. 9 is a perspective view of an implementation of a movable chair in a folded position.
Figure 10:
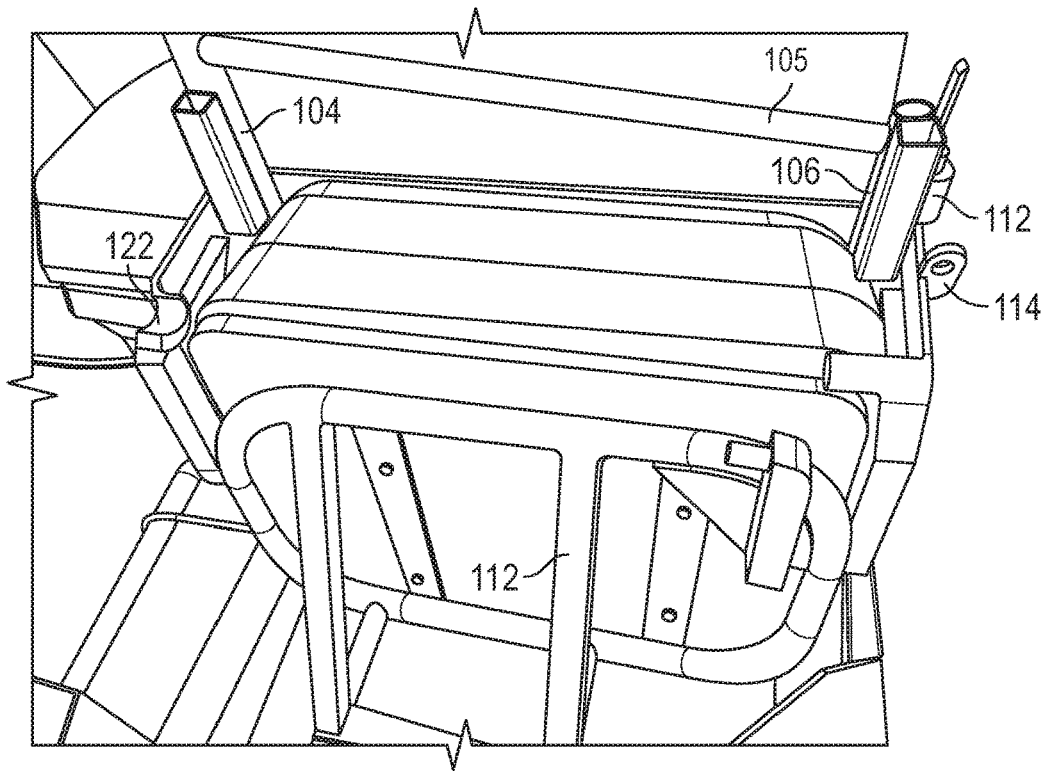
FIG. 10 is a back view of an implementation of a movable chair in a folded position.
Figure 11:
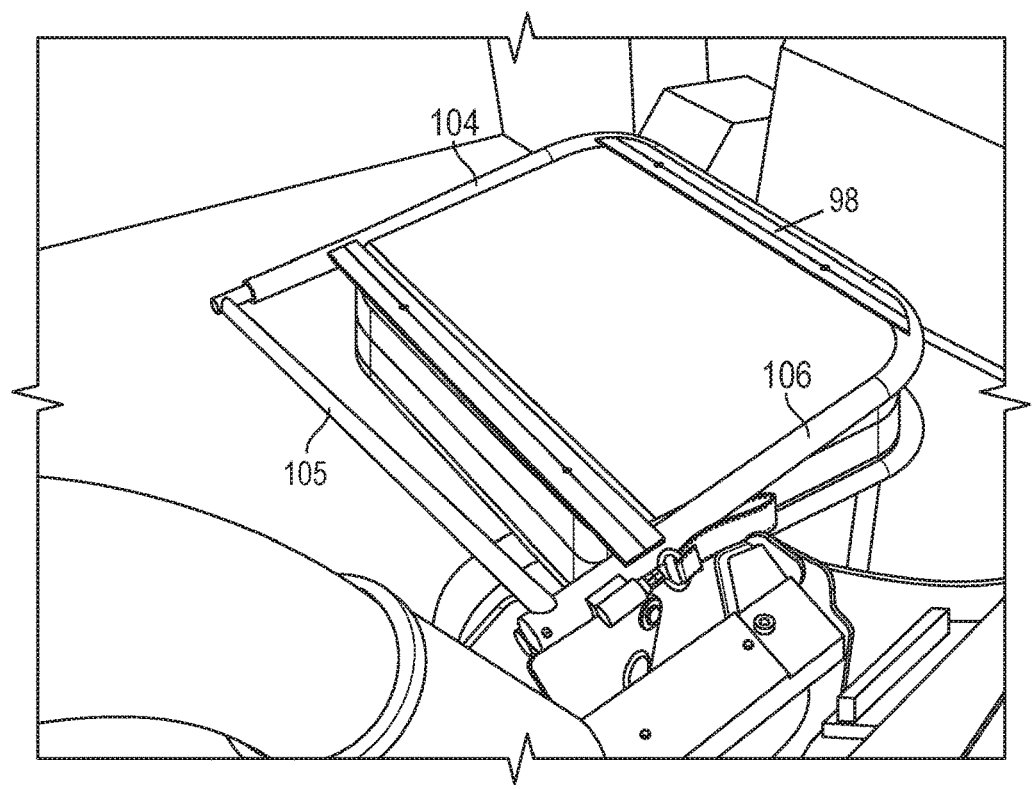
FIG. 11 is a side view of an implementation of a movable chair in an upright position.
Figure 12:
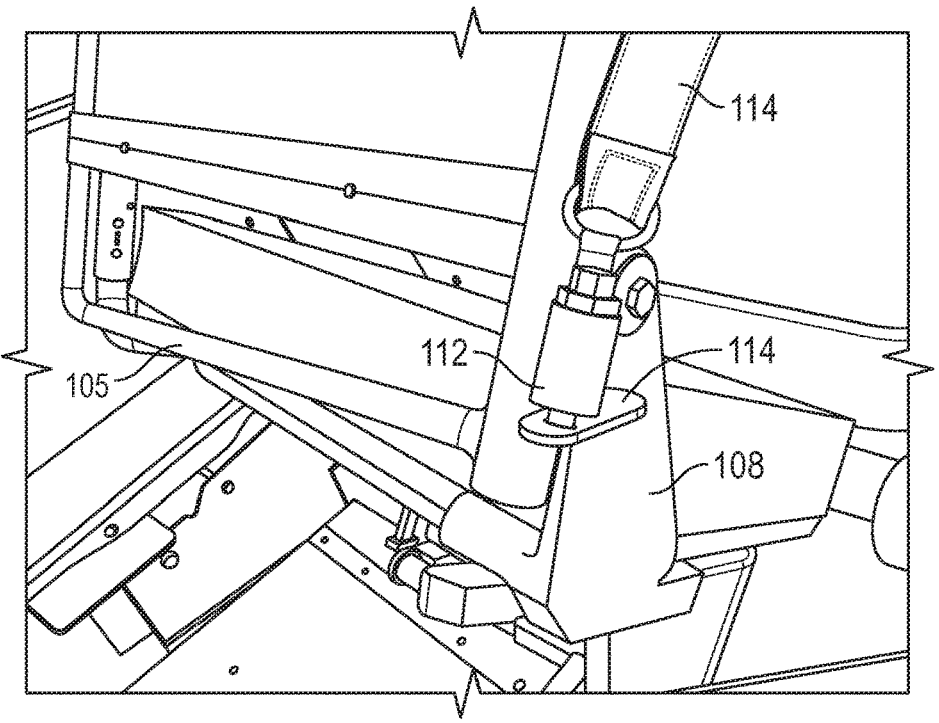
FIG. 12 is a perspective view of an implementation of a movable chair in a collapsed position.
Figure 15:
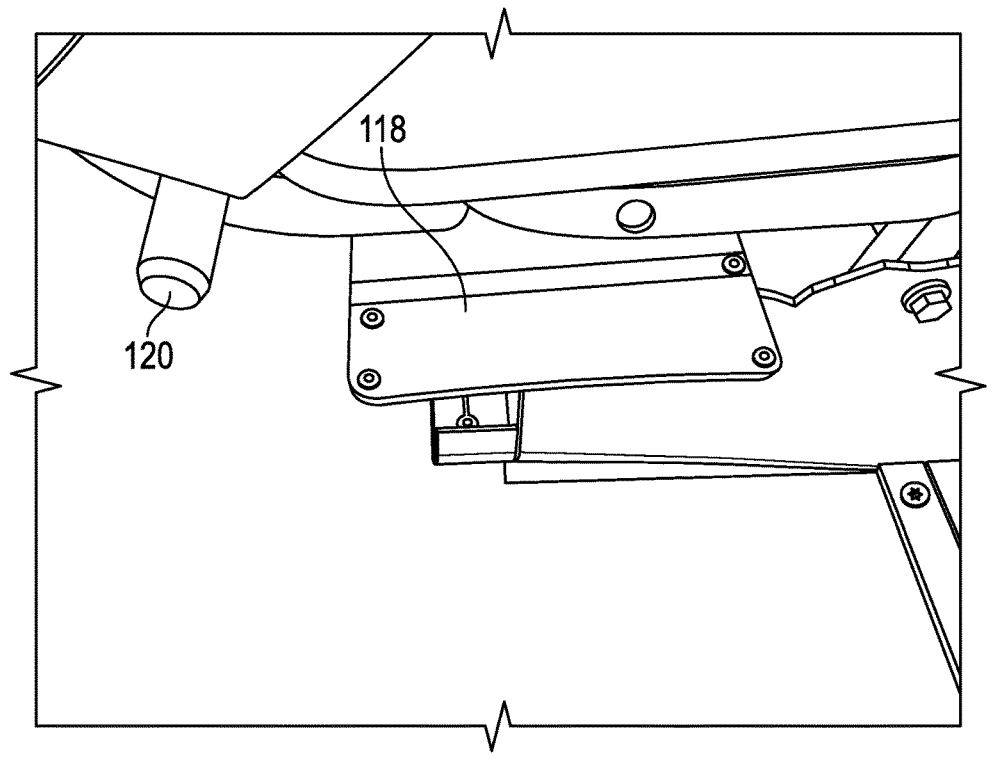
FIG. 15 is a close-up view of an implementation of a latch pin from FIG. 6.
Figure 16:
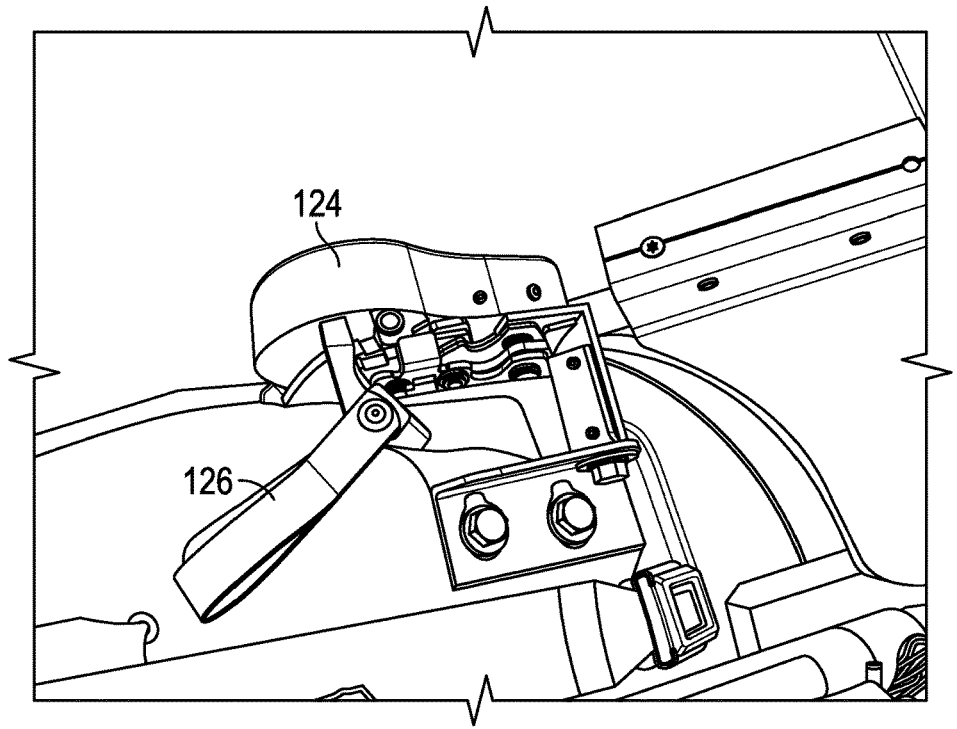
FIG. 16 is a close-up view of an implementation of a latching mechanism as described herein.
Figure 17:
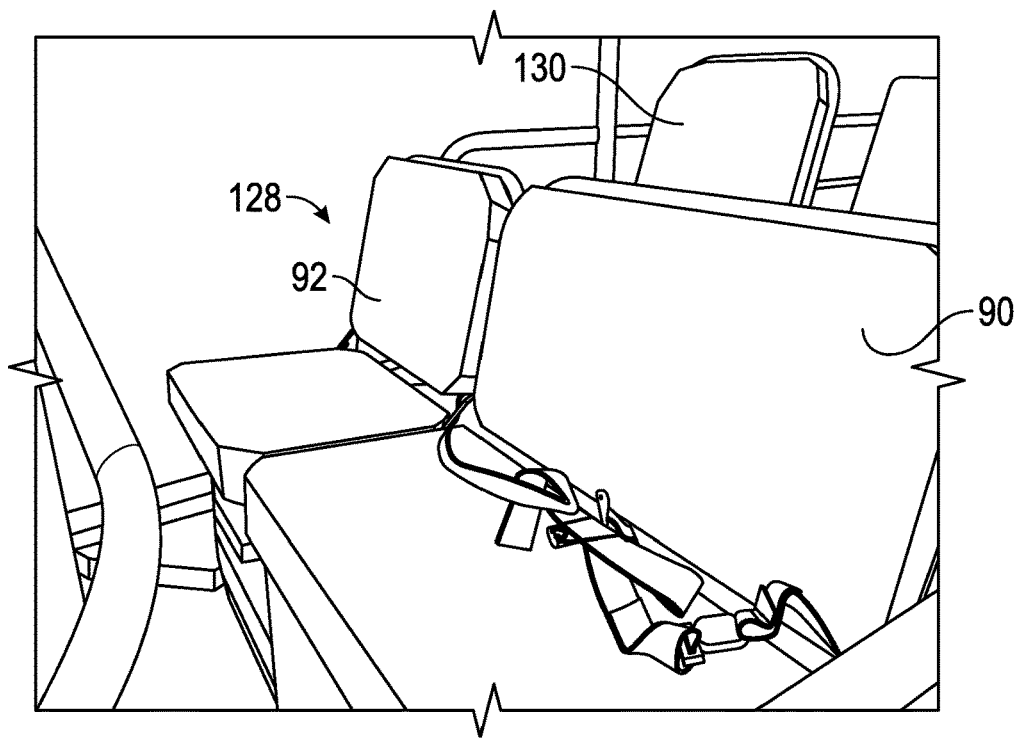
FIG. 17 is a perspective view of an implementation of a first row of seats.

Referring to FIGS. 9-17, an implementation of a vehicle seating system 88 is illustrated. The seating system has a first row of seats including a bench seat 90 and a movable chair 92. The movable chair 92 includes a metal frame 94. The metal frame 94 has a seat portion 96 and a back portion 98. The seat portion 96 includes a first end 100 and a second end 102. The back portion of the seat includes a first bar 104, a second bar 106 and a lock bar 105 coupled between the first bar 104 and the second bar 106. The second end 102 of the seat portion 96 is coupled to the first bar 104, as illustrated in FIG. 10, and to the second bar 106 of the back portion 98 through a seat hinge 108. In FIG. 9, the movable chair 92 is in a fully collapsed and folded position where the back portion 98 of the chair is collapsed onto the seat portion 96 of the movable chair 92. In FIG. 11, the movable chair 92 is in a partially or first collapsed position where the back portion is folded onto the seat portion. In FIG. 12, the movable chair 92 is in an unfolded position before being fully locked into place. In FIG. 12, a pin 112 and receiver can be seen in a secured position which work to secure the movable chair into the unfolded position. The pin and receiver may be released by pulling on the strap/handle 114 coupled to the pin 112. In FIG. 17, the movable chair is in a fully open and secured position available for a passenger to ride in.

Figure 13:
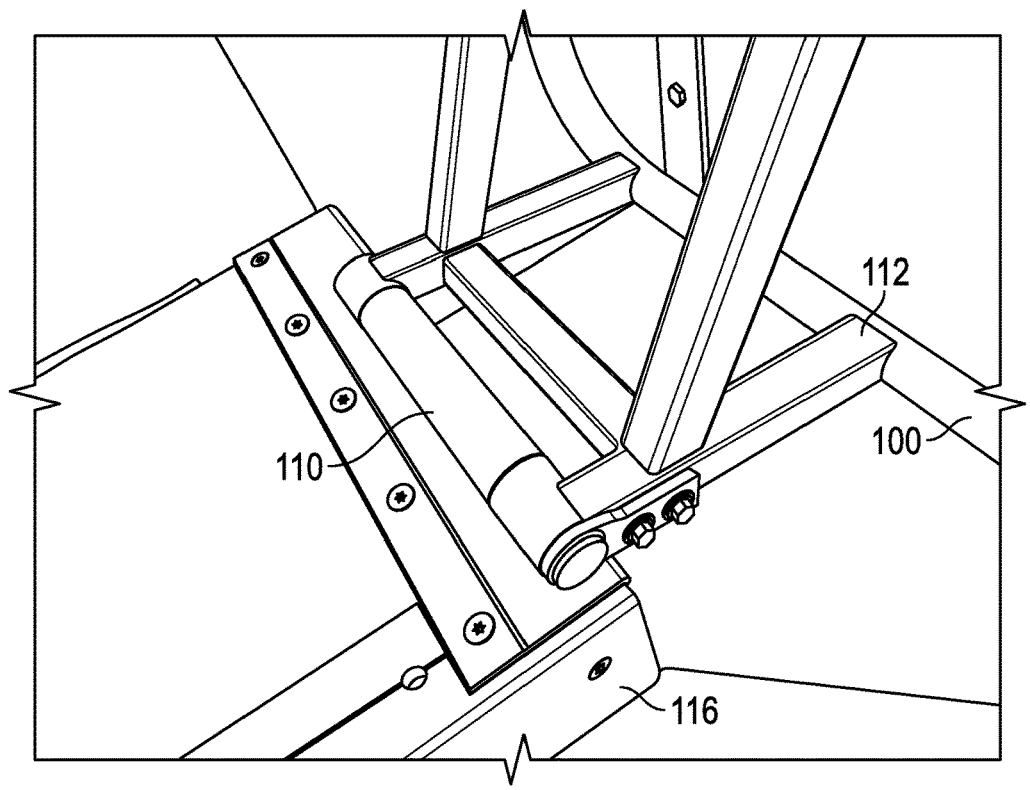
FIG. 13 is a perspective view of an implementation of a bracket coupled to an implementation of a step.

Referring back to FIG. 9, the movable chair 92 may be moved between a fully collapsed position and a fully upright position through a step hinge 110. As previously described in this document, different implementations of vehicle with side entry systems may have a step 116 to provide passengers a way to enter and exit the vehicle while in a standing position. The step hinge 110 is located on the step 116 and is coupled with the first end 100 and second end 102 of the seat portion 96 through a bracket 112. FIG. 13 shows a close-up view of the step hinge 110 and related components of the movable chair 92. In various implementations, the movable chair can be folded down to allow a passenger to enter the vehicle and access the second and third row of seats.

Figure 14:
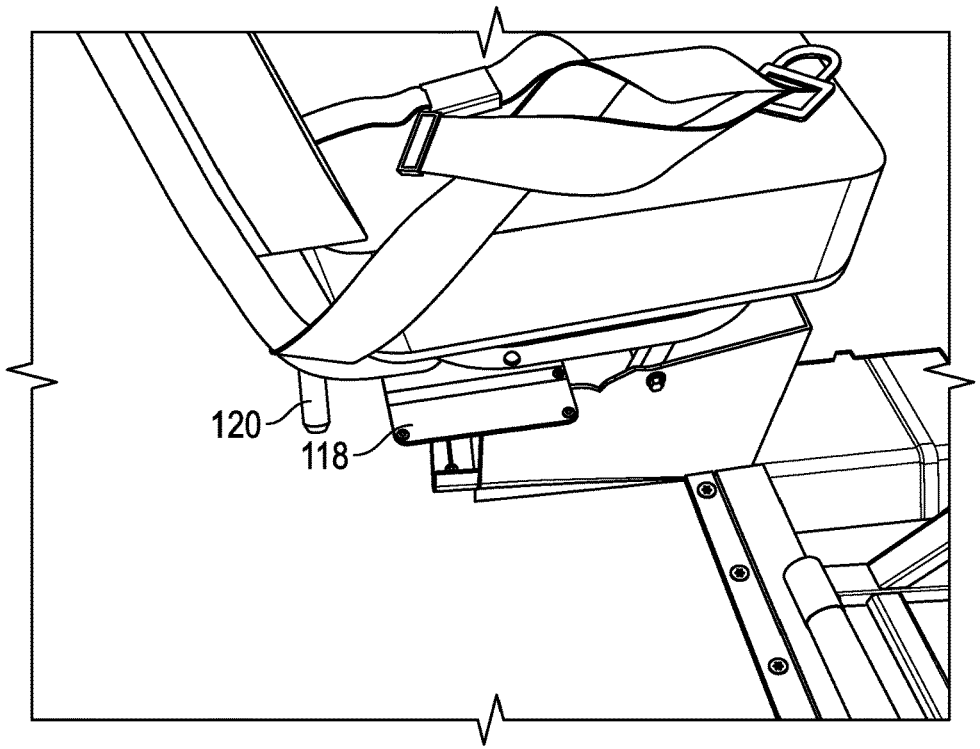
FIG. 14 is a side view of an implementation of a bench seat in a first row of seats in a vehicle seating system.

When the movable chair is moved to a fully upright position, it is locked into place through several mechanisms. Referring to FIGS. 9, 14 and 15, the seat portion and seat hinge of the movable chair 92 rest on a strike plate 118 coupled to the bench seat 90 of the first row of seating. The strike plate 118 may be made of a suitable low friction material such as, by non-limiting example, an automotive grade metal, a plastic material, or a composite material. The movable chair 92 is locked into place near the strike plate through a latch pin 120 configured to receive a portion 122 of the seat hinge 108. The lock bar 105 of the back portion 98 of the metal frame then closes over the latch pin 120. The movable chair also locks into place through a latching mechanism used in automotive applications 124 located on the opposite side of the movable chair from the latch pin 120. Referring to FIG. 16, the latching mechanism 124 can be released to allow the chair to collapse and fold by pulling on a release handle 126. The movable chair is further secured by a seat belt coupled to the subfloor when a passenger is in a seated and secured position.

Figure 18:
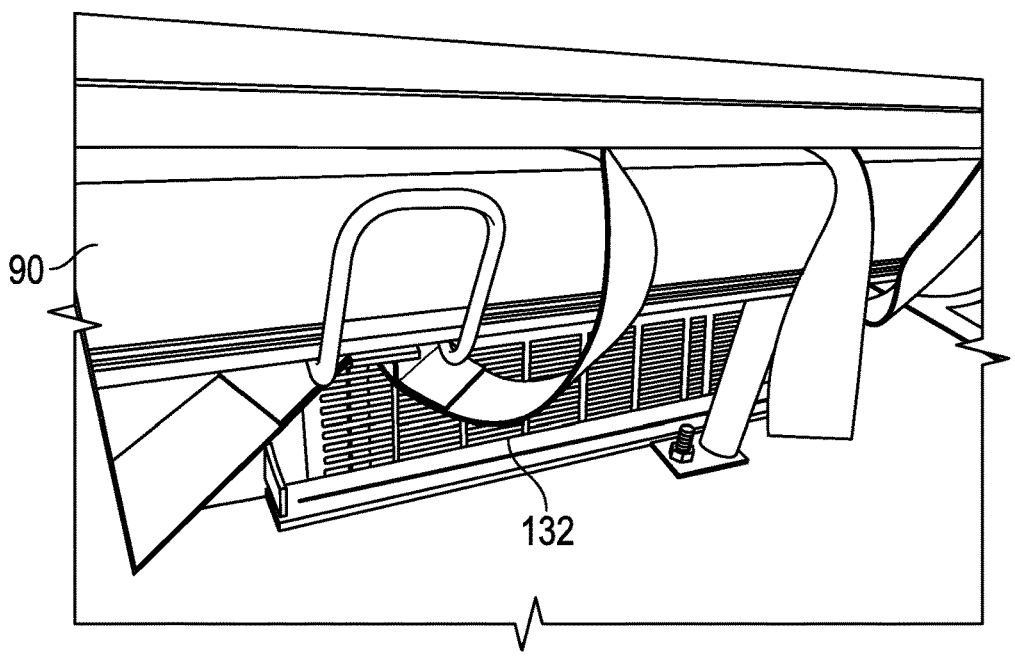
FIG. 18 is a front view of an implementation of a heater positioned under a first row of seats.
Figure 19:
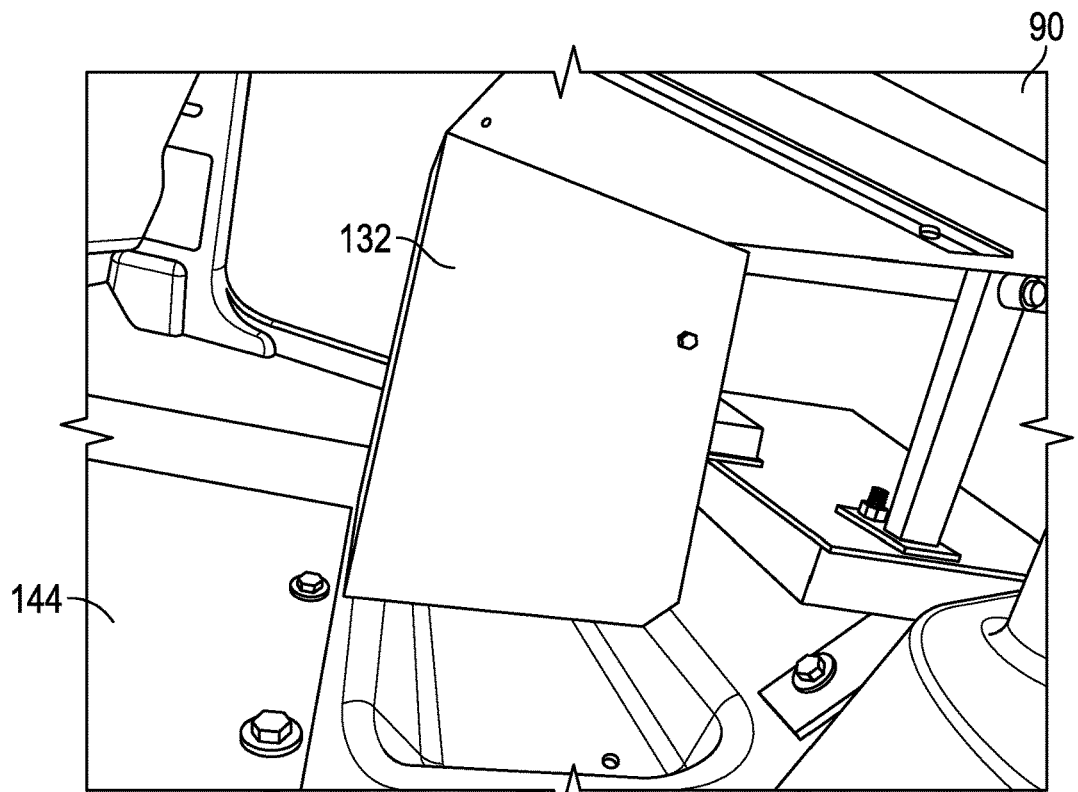
FIG. 19 is a side view of an implementation of a heater from FIG. 10.

Referring now to FIG. 17, a front view of an implementation of a first row of seats 128 comprising a bench seat 90 and movable chair 92 is illustrated. As previously described, the movable chair is in a fully upright and secured position. In various implementations, the vehicle seating system includes cushions coupled to each seat. The cushions may be made of an automotive grade foam or other suitable materials. The cushions may also be covered in a waterproof and/or water resistant material including vinyl, neoprene, or other suitable materials. A second row of seats 130 is illustrated behind the first row of seats. Referring to FIGS. 18 and 19, an implementation of a heater 132 under the bench seat is illustrated. The heater is configured to blow heated air towards the second row and third row of seats. In various implementations, the heater may connected to and supplied by the heater in the front of the vehicle. In other implementations, the heater may be powered and controlled independently from the other vehicle controls.

Figure 20:
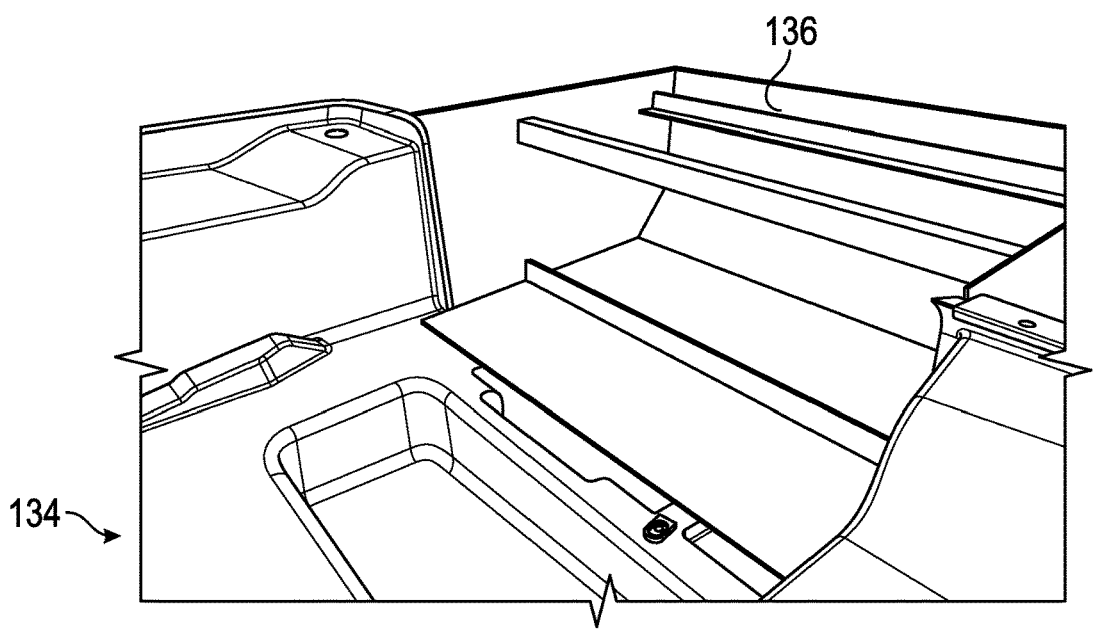
FIG. 20 is a perspective view of an implementation of an extended portion at the back of a vehicle for a third row of seats as described herein.
Figure 27:
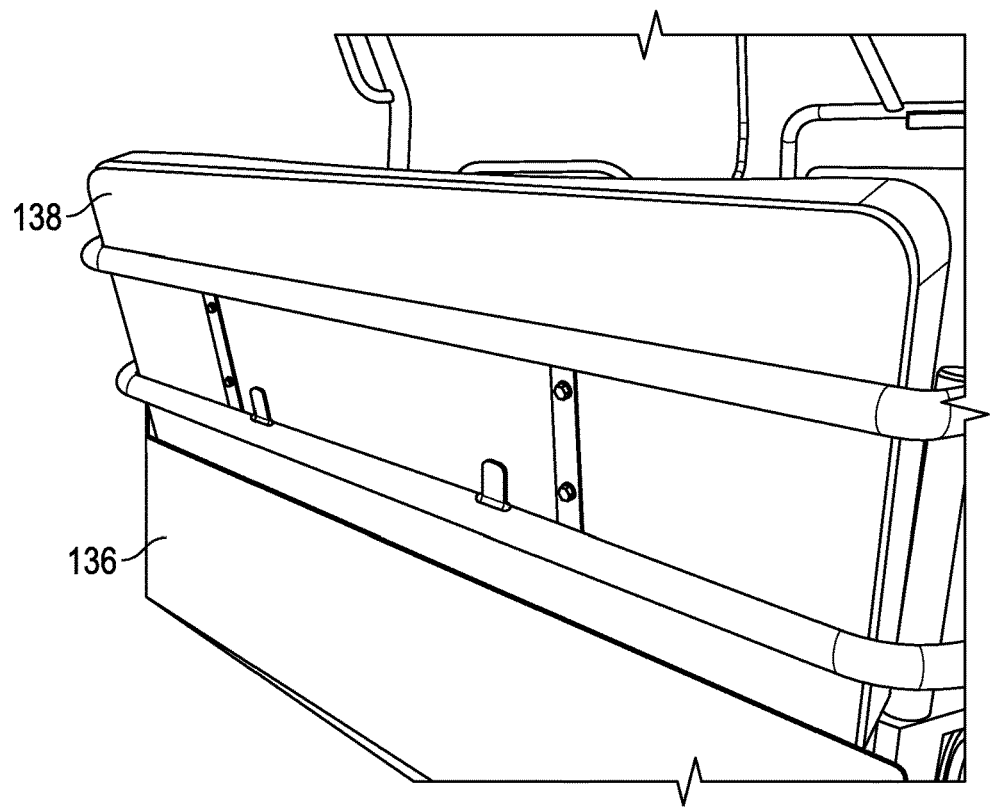
FIG. 27 is a back view of an implementation of a third row of seats in an implementation of a vehicle seating system.

Referring to FIG. 20, an implementation of a subfloor 134 of a vehicle is illustrated. The subfloor 134 may be the original factory floor of the vehicle that may be included under any carpeting, plastic flooring or other similar materials that come standard with a vehicle from a manufacturer. The subfloor 134 may be formed of the same material as the body of the vehicle including but not limited to iron, aluminum, plastic steel, glass, rubber, petroleum products, copper, steel, other suitable materials known in the art, or any combination thereof. An extended portion 136 of the vehicle may be built at the level of the subfloor 134 to hold and support a third row of seats 138 included in various implementations of a vehicle seating system as illustrated in FIGS. 23 and 27.

Figure 21:
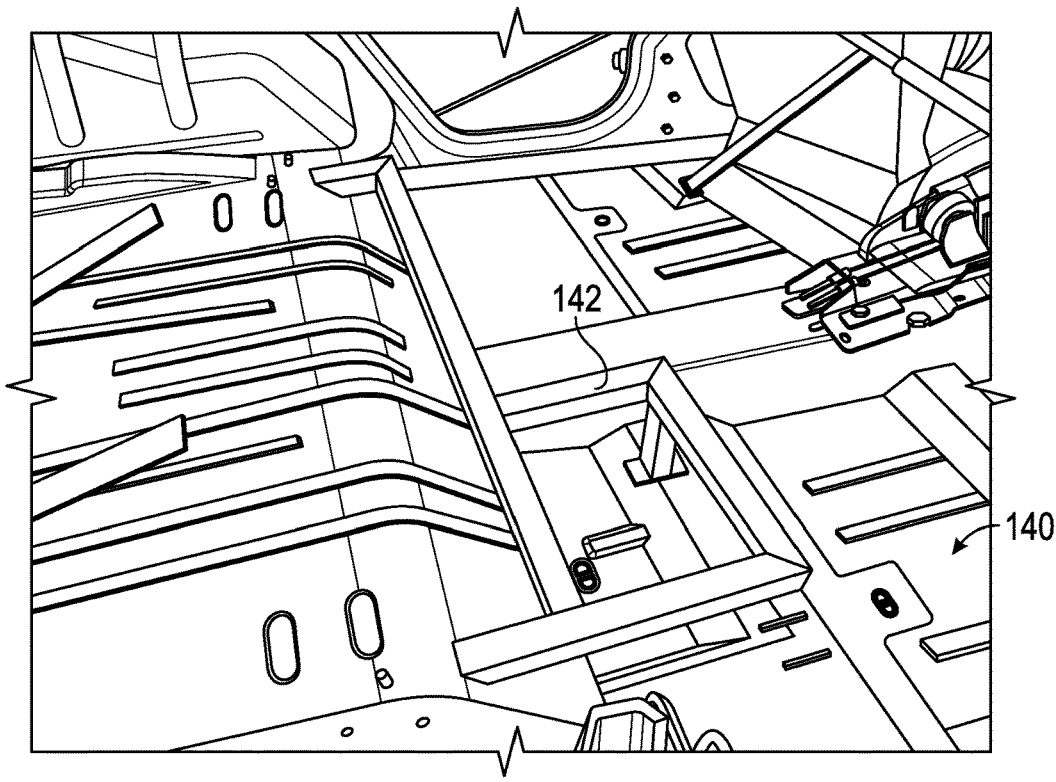
FIG. 21 is a perspective view of an implementation of a platform of a vehicle as described herein.

Referring to FIG. 21, a base floor 140 may be installed on top of the subfloor 134 of the vehicle. The base floor 140 may be formed of automotive grade plastics, plastic steel other suitable materials known in the art, or any combination thereof. The base floor 140 may include a frame 142 for the step 116 illustrated in FIG. 9. The frame may include automotive grade metal or similar materials to support the weight of various implementations of vehicle seating systems. A platform 144 may be included on the base floor. In various implementations of a vehicle seating system, various components may be coupled to the platform of the vehicle including but not limited to a first row of seating, a second row of seating, a third row of seating, and seat belts for each seat of the vehicle seating system.

Figure 22:
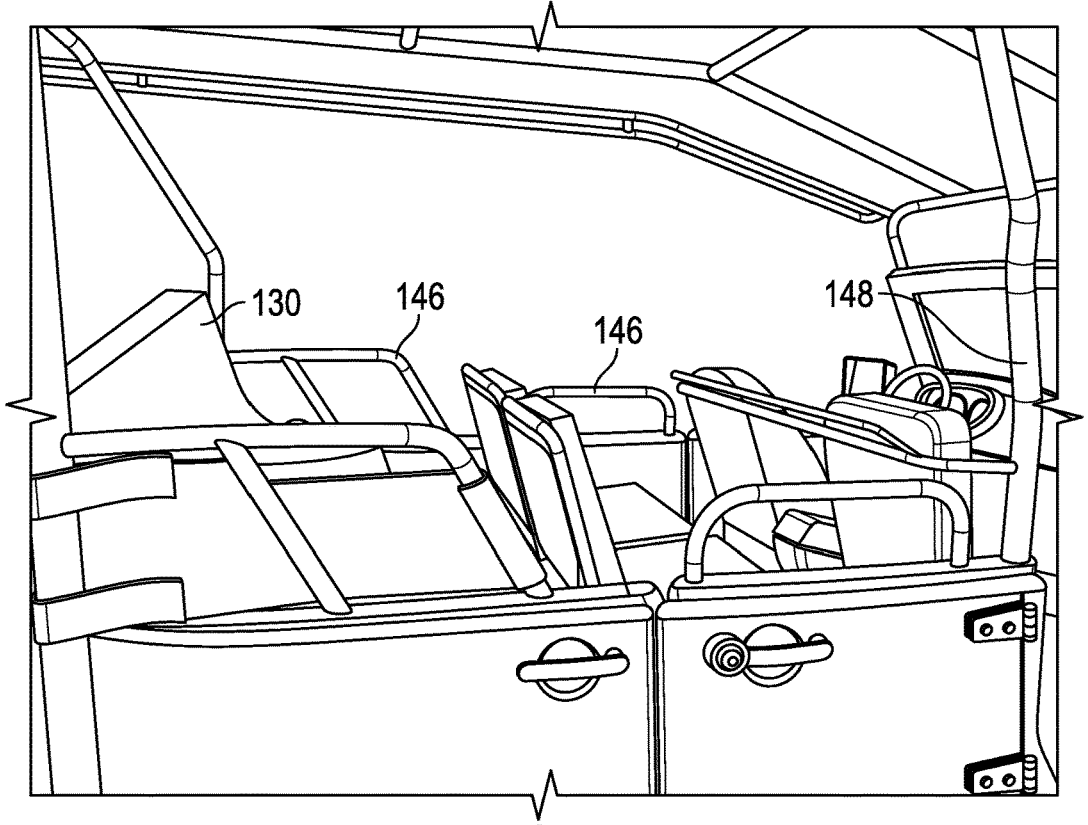
FIG. 22 is a side view of a vehicle having an implementation of a vehicle seating system as described herein.

Referring to FIG. 22, a side view of an implementation of a vehicle seating system is illustrated. In various implementations, two or more grab handles 146 are fixedly coupled to a top portion of a body of the vehicle adjacent the first row of seats, the second row of seats and the third row of seats. The two or more grab handles may be fixedly coupled to a door as illustrated in FIG. 28. As previously described, the door may include a light 150 to provide light to a passenger entering and exiting the vehicle. In various implementations, the light may be pointed in a downward direction to light the path of the passenger. The light 150 may be a light emitting diode (LED) or other suitable light source. The light 150 may be connected to a power source through an electrical connector as previously described. In some implementations, the door may not include a window. While in other implementations, the door may include a window or plastic sheeting to protect passengers from the elements while on an tour. Referring again to FIGS. 22 and 26, a vehicle seating system may also include a roll cage 148. The roll cage 148 may be coupled independently to the rear bumper of the vehicle as previously described.

Figure 23:
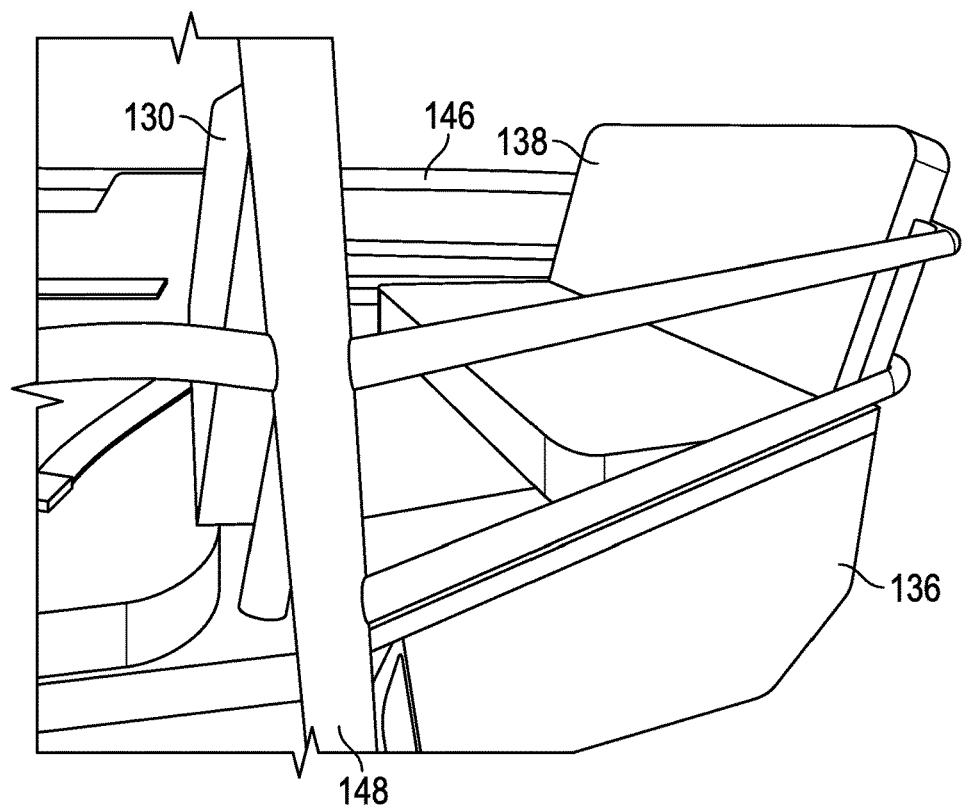
FIG. 23 is a side view of an implementation of a third row of seats of a vehicle seating system.
Figure 24:
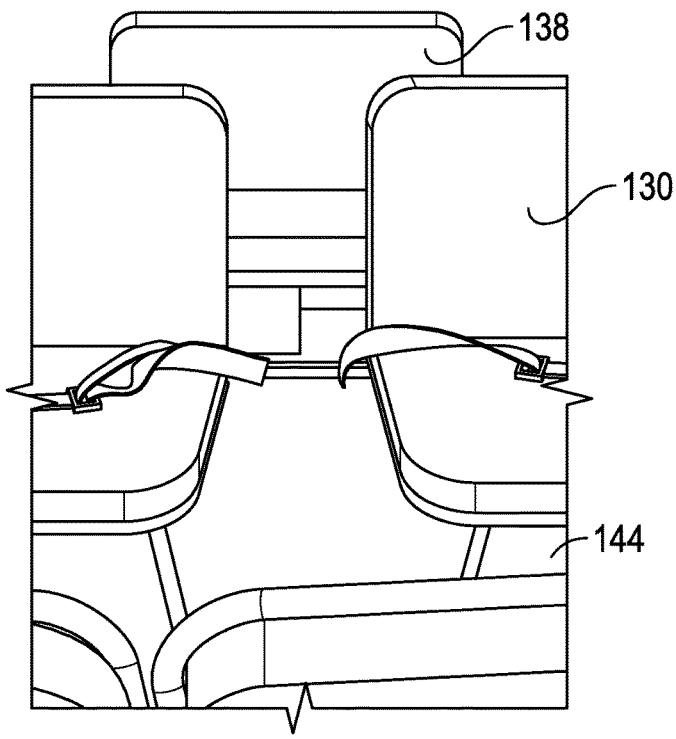
FIG. 24 is a front view of an implementation of a second row and third row of seats in an implementation of a vehicle seating system.
Figure 25:
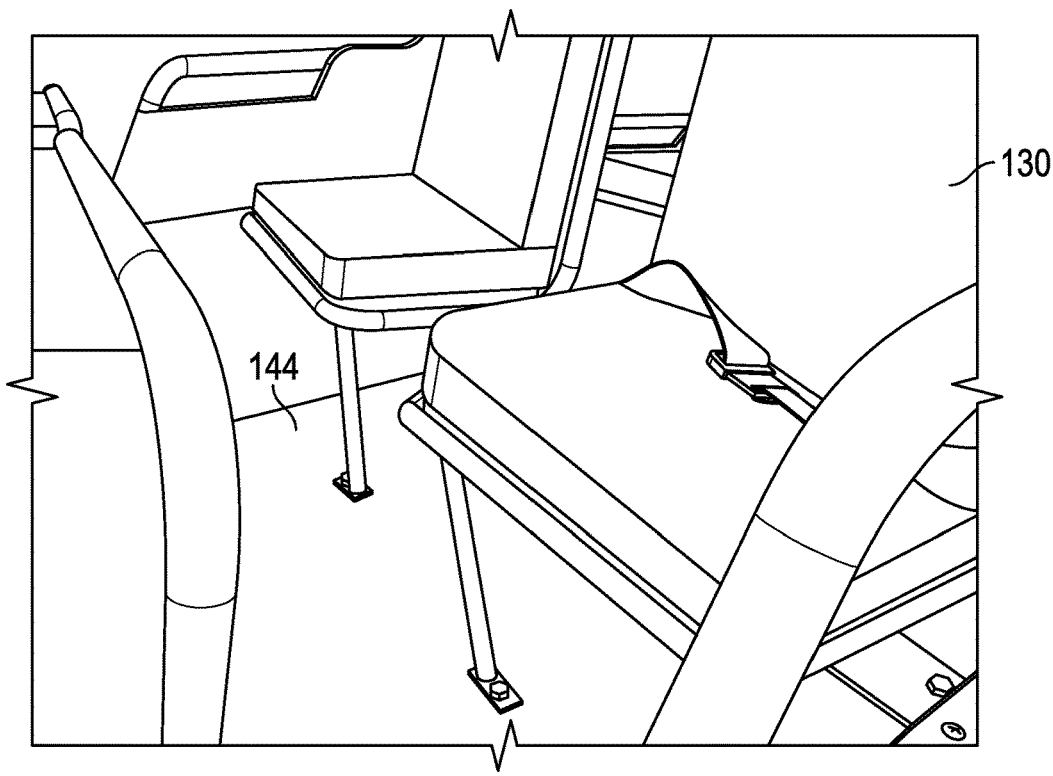
FIG. 25 is a perspective view of an implementation of a second row of seats in an implementation of a vehicle seating system.

Referring to FIGS. 23 and 24, a second row and third row of seats are illustrated. The second row of seats 130 includes two individual seats configured to allow a passenger to enough room to walk between the seats. The second row of seats 130 are positioned at a higher level relative to the subfloor that the first row of seats. The higher position of the second row of seats 130 may allow passengers a better view for sightseeing when riding in the vehicle. The third row of seats 138 is positioned at a second level that is higher relative to the subfloor than the second row of seats 130 to allow the passengers in the third row of seats to see above the second row of seats. In various implementations, the third row of seats includes a bench seat to allow the passengers to seat facing forward rather than facing the side of the vehicle as described in previous implementations. The bench seat in the third row of seats 138 may seat up to three passengers to sit in the third row of seats.

While a second row and a third row of seats have been illustrated, in various implementations, a second row and/or a third row of seats may not be included. Those of ordinary skill will be able to select the desired number of seats using the principles disclosed herein.

In places where the description above refers to particular implementations of vehicle seating systems and implementing components, sub-components, methods and sub-methods, it should be readily apparent that a number of modifications may be made without departing from the spirit thereof and that these implementations, implementing components, sub-components, methods and sub-methods may be applied to other vehicle seating systems and related methods.

What is claimed is:

1. A vehicle seating system comprising:
a movable chair comprising a metal frame comprising a seat portion and a back portion, the seat portion comprising a first end and a second end and the back portion comprising a first bar, a second bar and a lock bar coupled between the first bar and the second bar, the second end of the seat portion coupled to the first bar and second bar of the back portion through a seat hinge;
a step hingedly coupled through a step hinge with the first end and the second end of the seat portion through a bracket and through a latch mechanism; and
a latch pin, wherein a first end of the lock bar coupled to the first bar of the seat portion is configured to rest against the latch pin when the movable chair is in a fully upright position;
wherein the back portion is configured to fold down and the seat portion is configured to rotate upwardly on the seat hinge to allow a passenger to one of enter and exit the vehicle; and
wherein the movable chair is configured to lock into place in a fully upright position when the vehicle is in operation through the latching mechanism, the latch pin, and the lock bar.

2. The vehicle seating system of claim 1, further comprising a cushion coupled to each of the seat portion and the back portion of the movable chair.

3. The vehicle seating system of claim 1, further comprising a roll cage, the roll cage comprising a first end and a second end, wherein the first end is coupled to a frame of a windshield of the vehicle and the second end is coupled to a back bumper of the vehicle.

4. The vehicle seating system of claim 1, further comprising a grab handle fixedly coupled to a top portion of a door of the vehicle, the door located adjacent to the movable chair.

5. The vehicle seating system of claim 1, wherein the movable chair is positioned adjacent a bench seat to, in combination with the bench seat, form a first row of seats in a passenger portion of the vehicle.

6. The vehicle seating system of claim 5, further comprising:
a second row of seats comprising two individual seats spaced to allow a passenger enough room to walk between the two individual seats, the second row of seats positioned at a higher level relative to a subfloor of the vehicle than the first row of seats; and
a third row of seats comprising a bench seat configured to seat at least three passengers, the third row of seats positioned at a second level that is higher than the second row of seats relative to a subfloor of the vehicle.

7. The vehicle seating system of claim 6, further comprising one or more seat belts at each seat in the vehicle wherein the seat belts are coupled to a platform on a floor of the vehicle.

8. The vehicle seating system of claim 6, further comprising a heater positioned under the bench seat of the first row wherein the heater is configured to blow heated air towards the second row and toward the third row of seats.

9. A vehicle seating system comprising:
a first row of seats comprising a bench seat and a movable chair;
the movable chair comprising a metal frame comprising a seat portion and a back portion, the seat portion comprising a first end and a second end and the back portion comprising a first bar, a second bar and a lock bar coupled between the first bar and the second bar, the second end of the seat portion coupled to the first bar and the second bar of the back portion through a seat hinge;
a step coupled to a subfloor of the vehicle, the movable chair hingedly coupled to the step through a step hinge and the first end and the second end of the seat portion using a bracket and a latch mechanism, the movable chair configured to collapse and then fold forward to allow a passenger to enter the vehicle;
a latch pin, wherein a first end of the lock bar coupled to the first bar of the seat portion is configured to rest against the latch pin when the movable chair is in a fully upright position;
a second row of seats comprising two individual seats configured to allow a passenger enough room to walk between the seats, the second row of seats positioned at a higher level relative to the subfloor than the first row of seats; and
a third row of seats comprising a bench seat configured to seat at least three passengers, the third row of seats positioned at a second level that is higher relative to the subfloor than the second row of seats.

10. The vehicle seating system of claim 9, further comprising one or more cushions coupled to each of the rows of seats, the cushions comprising a seat cushion and a back cushion.

11. The vehicle seating system of claim 9, further comprising a roll cage extending over the vehicle seating system, the roll cage comprising a first end and a second end, wherein the first end is coupled to a frame of a windshield of the vehicle and the second end is coupled to a back bumper of the vehicle.

12. The vehicle seating system of claim 9, further comprising two or more grab handles fixedly coupled to a top portion of a body of the vehicle adjacent the first row of seats, the second row of seats and the third row of seats.

13. The vehicle seating system of claim 9, further comprising one or more seat belts at each seat in the vehicle wherein the seat belts are coupled to a platform on a floor of the vehicle.

14. The vehicle seating system of claim 9, further comprising a heater positioned under the bench seat of the first row wherein the heater is configured to blow air towards the second row and towards the third row of seats.

15. A vehicle seating system comprising:
a first row of seats comprising a bench and a movable chair;
the movable chair comprising a metal frame comprising a seat portion and a back portion, the seat portion comprising a first end and a second end and the back portion comprising a first bar, a second bar and a lock bar coupled between the first bar and the second bar, the second end of the seat portion coupled to the first bar and the second bar of the back portion through a seat hinge;
a step coupled to a subfloor of the vehicle, the movable chair hingedly coupled to the step through a step hinge and the first end and the second end of the seat portion through a bracket and a latch mechanism, the movable chair configured to collapse and then fold forward to allow a passenger to enter the vehicle;

a latch pin wherein a first end of the lock bar coupled to the first bar of the seat portion is configured to rest against the latch pin when the movable chair is in a fully upright position;

a second row of seats comprising two individual seats configured to allow a passenger enough room to walk between the seats, the second row of seats positioned at a higher level relative to the subfloor than the first row of seats; and a third row of seats comprising a bench seat configured to seat at least three passengers, the third row of seats positioned in an extended portion at a back of the vehicle and at a second level that is higher relative to the subfloor than the second row of seats.

16. The vehicle seating system of claim 15, further comprising one or more cushions coupled to each of the rows of seats, the one or more cushions comprising a seat cushion and a back cushion.

17. The vehicle seating system of claim 15, further comprising a roll cage extending over the vehicle seating system, the roll cage comprising a first end and a second end, wherein the first end is coupled to a frame of a windshield of the vehicle and the second end is coupled to a back bumper of the vehicle.

18. The vehicle seating system of claim 15, further comprising a two or more grab handles fixedly coupled to a top portion of a body of the vehicle adjacent the first row of seats, the second row of seats and the third row of seats.

19. The vehicle seating system of claim 15, further comprising one or more seat belts at each seat in the vehicle wherein the seat belts are coupled to a platform on a floor of the vehicle.

20. The vehicle seating system of claim 15, further comprising a heater positioned under the bench seat of the first row wherein the heater is configured to blow air towards the second row and toward the third row of seats.

* * * * *